US012451627B2

(12) United States Patent
Zerebilov

(10) Patent No.: US 12,451,627 B2
(45) Date of Patent: Oct. 21, 2025

(54) HIGH FREQUENCY MIDBOARD CONNECTOR

(71) Applicant: FCI USA LLC, Etters, PA (US)

(72) Inventor: Arkady Y. Zerebilov, Lancaster, PA (US)

(73) Assignee: FCI USA LLC, Etters, PA (US)

( * ) Notice: Subject to any disclaimer, the term of this patent is extended or adjusted under 35 U.S.C. 154(b) by 368 days.

(21) Appl. No.: 18/137,984

(22) Filed: Apr. 21, 2023

(65) Prior Publication Data

US 2023/0253722 A1 Aug. 10, 2023

Related U.S. Application Data

(63) Continuation of application No. 17/160,229, filed on Jan. 27, 2021, now Pat. No. 11,670,879.

(Continued)

(51) Int. Cl.

*H01R 12/53* (2011.01)

*H01R 12/71* (2011.01)

(Continued)

(52) U.S. Cl.

CPC ........... *H01R 12/53* (2013.01); *H01R 12/716* (2013.01); *H01R 13/502* (2013.01); *H01R 13/6581* (2013.01); *H01R 13/6592* (2013.01)

(58) Field of Classification Search

CPC .... H01R 12/53; H01R 12/712; H01R 13/502; H01R 13/6581; H01R 13/6592

(Continued)

(56) References Cited

U.S. PATENT DOCUMENTS 5,060,372 A * 10/1991 Capp .................... H01R 43/20 439/885

5,722,861 A * 3/1998 Wetter .................. H01R 43/16 439/924.1

(Continued)

FOREIGN PATENT DOCUMENTS

CA 2800738 A1 12/2011

CN 201114063 Y 9/2008

(Continued)

OTHER PUBLICATIONS

Taiwanese Office Action dated Sep. 3, 2024 in connection with Taiwanese Application No. 110103218.

(Continued)

*Primary Examiner* — Peter G Leigh

(74) *Attorney, Agent, or Firm* — Wolf, Greenfield & Sacks, P.C.

(57) ABSTRACT

A midboard cable connector assembly with a board connector and a cable connector. The board connector has terminals precisely positioned with respect to engagement features. A cable connector likewise has terminals precisely positioned with respect to complementary engagement features. When the connectors are pressed together for mating, the terminals of one or both connectors deform, generating a force that separates the connectors until the engagement features engage and block further backward motion. As the mating position is defined by the locations of the engagement features, the connectors can be designed with low over travel and a resulting short stub length, which promotes high frequency performance. High frequency performance is further promoted by a ground conductor interconnecting the beams forming mating contact portions of ground terminals, reducing the length of unconnected segments and by a cable (Continued)

clamp plate with complaint compression features that reduce distortion of the cables.

28 Claims, 8 Drawing Sheets

Related U.S. Application Data

(60) Provisional application No. 62/966,892, filed on Jan. 28, 2020.

(51) Int. Cl.
*H01R 13/502* (2006.01)
*H01R 13/6581* (2011.01)
*H01R 13/6592* (2011.01)

(58) Field of Classification Search
USPC .......................................................... 439/78
See application file for complete search history.

(56) References Cited

U.S. PATENT DOCUMENTS 5,848,920 A * 12/1998 Klein .................... H01R 43/16 439/60
6,453,552 B1 * 9/2002 Chavez, Jr ............ H01R 43/16 29/874
6,764,336 B2 * 7/2004 Ma ........................ H01R 43/24 439/604
7,112,072 B2 * 9/2006 Korsunsky ........... H01R 13/652 439/108
7,422,483 B2 9/2008 Avery et al.
7,431,608 B2 10/2008 Sakaguchi et al.
7,445,471 B1 11/2008 Scherer et al.
7,448,897 B2 11/2008 Dawiedczyk et al.
7,462,942 B2 12/2008 Tan et al.
7,485,012 B2 2/2009 Daugherty et al.
7,494,383 B2 2/2009 Cohen et al.
7,497,693 B1 3/2009 Wu
7,534,142 B2 5/2009 Avery et al.
7,540,747 B2 6/2009 Ice et al.
7,540,781 B2 6/2009 Kenny et al.
7,549,897 B2 6/2009 Fedder et al.
7,553,190 B2 * 6/2009 Laurx ................. H01R 13/514 439/607.07
7,575,471 B2 8/2009 Long
7,581,990 B2 9/2009 Kirk et al.
7,585,188 B2 9/2009 Regnier
7,588,464 B2 9/2009 Kim
7,613,011 B2 11/2009 Grundy et al.
7,621,779 B2 11/2009 Laurx et al.
7,628,617 B2 12/2009 Brown et al.
7,649,368 B2 1/2010 Eldridge et al.
7,652,381 B2 1/2010 Grundy et al.
7,654,831 B1 2/2010 Wu
7,658,654 B2 2/2010 Ohyama et al.
7,682,207 B2 * 3/2010 Clark .................... H01R 43/16 439/885
7,686,659 B2 3/2010 Peng
7,690,930 B2 4/2010 Chen et al.
7,713,077 B1 5/2010 McGowan et al.
7,719,843 B2 5/2010 Dunham
7,722,398 B2 5/2010 Ma
7,722,401 B2 5/2010 Kirk et al.
7,722,404 B2 5/2010 Neumetzler
7,731,537 B2 6/2010 Amleshi et al.
7,744,414 B2 6/2010 Scherer et al.
7,753,731 B2 7/2010 Cohen et al.
7,764,504 B2 7/2010 Phillips et al.
7,766,668 B1 8/2010 Bishop
7,771,233 B2 8/2010 Gailus
7,775,802 B2 8/2010 Defibaugh et al.
7,781,294 B2 8/2010 Mauder et al.
7,789,676 B2 9/2010 Morgan et al.
7,794,240 B2 9/2010 Cohen et al.
7,794,278 B2 9/2010 Cohen et al.
7,806,698 B2 10/2010 Regnier
7,811,129 B2 10/2010 Glover et al.
7,819,675 B2 10/2010 Ko et al.
7,824,197 B1 11/2010 Westman et al.
7,828,560 B2 11/2010 Wu et al.
7,857,630 B2 12/2010 Hermant et al.
7,862,344 B2 1/2011 Morgan et al.
7,871,294 B2 1/2011 Long
7,871,296 B2 1/2011 Fowler et al.
7,874,873 B2 1/2011 Do et al.
7,887,371 B2 2/2011 Kenny et al.
7,906,730 B2 3/2011 Atkinson et al.
7,914,302 B1 3/2011 Zhu
7,914,304 B2 3/2011 Cartier et al.
7,976,318 B2 7/2011 Fedder et al.
7,985,097 B2 7/2011 Gulla
7,993,147 B2 8/2011 Cole et al.
8,002,581 B1 8/2011 Whiteman, Jr. et al.
8,016,616 B2 9/2011 Glover et al.
8,018,733 B2 9/2011 Jia
8,036,500 B2 10/2011 McColloch
8,057,266 B1 11/2011 Roitberg
8,057,267 B2 11/2011 Johnescu
8,083,553 B2 12/2011 Manter et al.
8,092,235 B2 1/2012 Frantum, Jr. et al.
8,092,254 B2 1/2012 Miyazaki et al.
8,100,699 B1 1/2012 Costello
8,157,573 B2 4/2012 Tanaka
8,162,675 B2 4/2012 Regnier et al.
RE43,427 E 5/2012 Dawiedczyk et al.
8,167,651 B2 5/2012 Glover et al.
8,182,289 B2 5/2012 Stokoe et al.
8,192,222 B2 6/2012 Kameyama
8,195,017 B2 6/2012 Kaneshiro et al.
8,197,285 B2 6/2012 Farmer
8,210,877 B2 7/2012 Droesbeke
8,215,968 B2 7/2012 Cartier et al.
8,226,441 B2 7/2012 Regnier et al.
8,251,745 B2 8/2012 Johnescu
8,272,877 B2 9/2012 Stokoe et al.
8,282,402 B2 10/2012 Ngo
8,292,669 B2 10/2012 Wang
8,308,491 B2 11/2012 Nichols et al.
8,308,512 B2 11/2012 Ritter et al.
8,337,243 B2 12/2012 Elkhatib et al.
8,338,713 B2 12/2012 Fjelstad et al.
8,358,504 B2 1/2013 McColloch et al.
8,371,875 B2 2/2013 Gailus
8,371,876 B2 2/2013 Davis
8,382,524 B2 2/2013 Khilchenko et al.
8,398,433 B1 3/2013 Yang
8,419,472 B1 4/2013 Swanger et al.
8,439,704 B2 5/2013 Reed
8,449,312 B2 5/2013 Lang et al.
8,449,330 B1 5/2013 Schroll et al.
8,465,302 B2 6/2013 Regnier et al.
8,465,320 B2 6/2013 Long
8,469,738 B2 6/2013 Long
8,469,745 B2 6/2013 Davis et al.
8,475,210 B2 7/2013 Wang
8,535,065 B2 9/2013 Costello
8,540,525 B2 9/2013 Regnier et al.
8,545,240 B2 10/2013 Casher et al.
8,550,861 B2 10/2013 Cohen et al.
8,553,102 B2 10/2013 Yamada
8,556,657 B1 10/2013 Nichols
8,588,561 B2 11/2013 Zbinden et al.
8,588,562 B2 11/2013 Zbinden et al.
8,597,045 B2 12/2013 Zhu
8,597,055 B2 12/2013 Regnier et al.
8,597,056 B2 12/2013 Blanchfield
8,632,365 B2 1/2014 Ngo
8,647,141 B2 2/2014 Lee et al.
8,651,880 B2 2/2014 Wu et al.
8,657,627 B2 2/2014 McNamara et al.
8,662,923 B2 3/2014 Wu
8,672,707 B2 3/2014 Nichols et al.

(56) References Cited

U.S. PATENT DOCUMENTS 8,678,860 B2 3/2014 Minich et al.
8,690,589 B2 4/2014 Ngo
8,690,604 B2 4/2014 Davis
8,715,003 B2 5/2014 Buck et al.
8,740,644 B2 6/2014 Long
8,753,145 B2 6/2014 Lang et al.
8,758,051 B2 6/2014 Nonen et al.
8,764,460 B2 7/2014 Smink et al.
8,764,464 B2 7/2014 Buck et al.
8,771,016 B2 7/2014 Atkinson et al.
8,780,581 B2 7/2014 Merz et al.
8,787,711 B2 7/2014 Zbinden et al.
8,804,342 B2 8/2014 Behziz et al.
8,814,595 B2 8/2014 Cohen et al.
8,830,679 B2 9/2014 Scholeno
8,845,364 B2 9/2014 Wanha et al.
8,858,243 B2 10/2014 Luo et al.
8,860,454 B2 10/2014 Oniyama et al.
8,864,521 B2 10/2014 Atkinson et al.
8,870,471 B2 10/2014 Ito et al.
8,888,531 B2 11/2014 Jeon
8,888,533 B2 11/2014 Westman et al.
8,905,767 B2 12/2014 Putt, Jr. et al.
8,911,255 B2 12/2014 Scherer et al.
8,926,377 B2 1/2015 Kirk et al.
8,944,831 B2 2/2015 Stoner et al.
8,992,236 B2 3/2015 Wittig et al.
8,992,237 B2 3/2015 Regnier et al.
8,998,642 B2 4/2015 Manter et al.
9,004,942 B2 4/2015 Paniauqa
9,011,177 B2 4/2015 Lloyd et al.
9,022,806 B2 5/2015 Cartier, Jr. et al.
9,028,201 B2 5/2015 Kirk et al.
9,028,281 B2 5/2015 Kirk et al.
9,035,183 B2 5/2015 Kodama et al.
9,040,824 B2 5/2015 Guetig et al.
9,071,001 B2 6/2015 Scherer et al.
9,077,118 B2 7/2015 Szu et al.
9,118,151 B2 8/2015 Tran et al.
9,119,292 B2 8/2015 Gundel
9,124,009 B2 9/2015 Atkinson et al.
9,136,634 B2 9/2015 De Geest et al.
9,142,921 B2 9/2015 Wanha et al.
9,172,161 B2 10/2015 Walden et al.
9,190,776 B2 11/2015 Lee et al.
9,203,171 B2 12/2015 Yu et al.
9,210,817 B2 12/2015 Briant
9,214,768 B2 12/2015 Pao et al.
9,219,335 B2 12/2015 Atkinson et al.
9,225,085 B2 12/2015 Cartier, Jr. et al.
9,232,676 B2 1/2016 Sechrist et al.
9,246,251 B2 1/2016 Regnier et al.
9,246,262 B2 1/2016 Brown
9,246,280 B2 1/2016 Neer
9,257,778 B2 2/2016 Buck et al.
9,257,794 B2 2/2016 Wanha et al.
9,276,358 B2 3/2016 Ista
9,277,649 B2 3/2016 Ellison
9,281,636 B1 3/2016 Schmitt
9,300,067 B2 3/2016 Yokoo
9,306,334 B2 4/2016 Zhu
9,312,618 B2 4/2016 Regnier et al.
9,337,585 B1 5/2016 Yang
9,350,108 B2 5/2016 Long
9,356,401 B1 5/2016 Horning et al.
9,362,678 B2 6/2016 Wanha et al.
9,368,916 B2 6/2016 Heyvaert et al.
9,373,917 B2 6/2016 Sypolt et al.
9,374,165 B2 6/2016 Zbinden et al.
9,385,455 B2 7/2016 Regnier et al.
9,389,368 B1 7/2016 Sharf
9,391,407 B1 7/2016 Bucher et al.
9,413,112 B2 8/2016 Helster et al.
9,425,525 B2 8/2016 Walden et al.
9,450,344 B2 9/2016 Cartier, Jr. et al.
9,472,900 B1 10/2016 Phillips et al.
9,490,558 B2 11/2016 Wanha et al.
9,509,089 B2 11/2016 Mathews et al.
9,509,094 B2 11/2016 Mathews et al.
9,509,101 B2 11/2016 Cartier, Jr. et al.
9,509,102 B2 11/2016 Sharf et al.
9,520,680 B2 12/2016 Hsu et al.
9,520,689 B2 12/2016 Cartier, Jr. et al.
9,531,133 B1 12/2016 Horning et al.
9,553,381 B2 1/2017 Regnier
9,553,401 B2 1/2017 Mathews et al.
9,559,446 B1 1/2017 Wetzel et al.
9,560,760 B2 1/2017 Wig
9,564,696 B2 2/2017 Gulla
9,608,348 B2 3/2017 Wanha et al.
9,651,752 B2 5/2017 Zbinden et al.
9,653,829 B2 5/2017 Long
9,660,364 B2 5/2017 Wig et al.
9,666,961 B2 5/2017 Horning et al.
9,668,378 B2 5/2017 Phillips
9,671,582 B2 6/2017 Yeh
9,680,266 B2 6/2017 Tomada
9,680,273 B2 6/2017 Light et al.
9,685,724 B2 6/2017 Tojo
9,685,736 B2 6/2017 Gailus et al.
9,711,901 B2 7/2017 Scholeno
9,735,495 B2 8/2017 Gross
9,761,974 B2 9/2017 L'Esperance et al.
9,774,144 B2 9/2017 Cartier, Jr. et al.
9,780,496 B2 * 10/2017 Guo .................... H01R 13/405
9,801,301 B1 10/2017 Costello
9,829,662 B2 11/2017 Kurashima
9,841,572 B2 12/2017 Zbinden et al.
9,843,135 B2 12/2017 Guetig et al.
9,882,303 B1 1/2018 Chalas et al.
9,929,500 B1 3/2018 Ista
9,929,512 B1 3/2018 Trout et al.
9,948,026 B2 4/2018 Mathews et al.
9,985,367 B2 5/2018 Wanha et al.
9,985,389 B1 5/2018 Morgan et al.
10,020,614 B1 7/2018 Bucher
10,056,706 B2 8/2018 Wanha et al.
10,062,984 B2 8/2018 Regnier
10,062,988 B1 8/2018 Vinther et al.
10,069,225 B2 9/2018 Wanha et al.
10,096,945 B2 10/2018 Cartier, Jr. et al.
10,109,968 B2 10/2018 Khazen
10,114,182 B2 10/2018 Zbinden et al.
10,116,080 B1 10/2018 Ju et al.
10,128,627 B1 11/2018 Kazav
10,135,199 B1 11/2018 Ju
10,135,204 B2 * 11/2018 Zhang .................... H01R 43/24
10,135,211 B2 11/2018 Lloyd et al.
10,136,517 B2 11/2018 Shirasaki
10,148,024 B2 12/2018 Ju et al.
10,153,571 B2 12/2018 Kachlic
10,170,869 B2 1/2019 Gailus et al.
10,181,663 B2 1/2019 Regnier
10,205,286 B2 2/2019 Provencher et al.
10,243,305 B1 3/2019 Pan et al.
10,249,988 B2 4/2019 Craton
10,276,995 B2 4/2019 Little
10,305,224 B2 5/2019 Girard, Jr.
RE47,459 E 6/2019 Vinther et al.
10,348,007 B2 7/2019 Kataoka et al.
10,367,280 B2 7/2019 Lloyd et al.
10,367,283 B2 7/2019 L'Esperance et al.
10,367,308 B2 7/2019 Little et al.
10,374,355 B2 8/2019 Ayzenberg et al.
10,381,767 B1 8/2019 Milbrand, Jr. et al.
10,446,960 B2 10/2019 Guy Ritter et al.
10,461,475 B2 10/2019 Little
10,462,904 B2 10/2019 Shirasaki
10,511,118 B2 12/2019 Beltran et al.
10,551,580 B2 2/2020 Regnier et al.
10,555,437 B2 2/2020 Little
10,588,243 B2 3/2020 Little et al.
10,651,606 B2 5/2020 Little
10,680,364 B2 6/2020 Champion et al.

(56) References Cited

U.S. PATENT DOCUMENTS

| | | | |
|---|---|---|---|
| 10,699,823 | B2 | 6/2020 | Blackburn et al. |
| 10,716,213 | B2 | 7/2020 | Kim et al. |
| 10,797,417 | B2 | 10/2020 | Scholeno et al. |
| 10,840,622 | B2 | 11/2020 | Sasame et al. |
| 10,847,930 | B2 | 11/2020 | Ayzenberg et al. |
| 10,847,937 | B2 | 11/2020 | Cartier, Jr. et al. |
| 10,879,643 | B2 | 12/2020 | Astbury et al. |
| 10,910,770 | B2 | 2/2021 | Winey |
| 10,944,215 | B2 | 3/2021 | Chua et al. |
| 10,958,005 | B1 | 3/2021 | Dube |
| 11,050,176 | B2 | 6/2021 | Yang et al. |
| 11,070,006 | B2 | 7/2021 | Gailus et al. |
| 11,101,611 | B2 | 8/2021 | Winey et al. |
| 11,143,830 | B2 | 10/2021 | Luo et al. |
| 11,177,592 | B2 | 11/2021 | Scholeno et al. |
| 11,189,943 | B2 | 11/2021 | Zerebilov et al. |
| 11,205,877 | B2 | 12/2021 | Diaz et al. |
| 11,271,348 | B1 | 3/2022 | Chen et al. |
| 11,309,655 | B2 | 4/2022 | Avery et al. |
| 11,372,178 | B2 | 6/2022 | Zbinden et al. |
| 11,437,762 | B2 | 9/2022 | Manter et al. |
| 11,444,404 | B2 | 9/2022 | Si et al. |
| 11,509,100 | B2 | 11/2022 | Chen et al. |
| 11,626,697 | B2 | 4/2023 | Streckewald et al. |
| 11,637,390 | B2 | 4/2023 | Zerebilov et al. |
| 11,670,879 | B2 | 6/2023 | Zerebilov |
| 11,677,188 | B2 | 6/2023 | Diaz et al. |
| 11,715,922 | B2 | 8/2023 | Winey et al. |
| 11,735,852 | B2 | 8/2023 | Cartier, Jr. et al. |
| 11,757,228 | B2 | 9/2023 | Lai et al. |
| 11,824,311 | B2 | 11/2023 | Gailus et al. |
| 11,984,678 | B2 | 5/2024 | Zerebilov et al. |
| 11,996,654 | B2 | 5/2024 | Diaz et al. |
| 2008/0207023 | A1 | 8/2008 | Tuin et al. |
| 2008/0246555 | A1 | 10/2008 | Kirk et al. |
| 2008/0248658 | A1 | 10/2008 | Cohen et al. |
| 2008/0248659 | A1 | 10/2008 | Cohen et al. |
| 2008/0248660 | A1 | 10/2008 | Kirk et al. |
| 2008/0264673 | A1 | 10/2008 | Chi et al. |
| 2008/0267620 | A1 | 10/2008 | Cole et al. |
| 2008/0297988 | A1 | 12/2008 | Chau |
| 2008/0305689 | A1 | 12/2008 | Zhang et al. |
| 2009/0011641 | A1 | 1/2009 | Cohen et al. |
| 2009/0011645 | A1 | 1/2009 | Laurx et al. |
| 2009/0011664 | A1 | 1/2009 | Laurx et al. |
| 2009/0017682 | A1 | 1/2009 | Amleshi et al. |
| 2009/0023330 | A1 | 1/2009 | Stoner et al. |
| 2009/0051558 | A1 | 2/2009 | Dorval |
| 2009/0098767 | A1 | 4/2009 | Long |
| 2009/0117386 | A1 | 5/2009 | Vacanti et al. |
| 2009/0130913 | A1 | 5/2009 | Yi et al. |
| 2009/0130918 | A1 | 5/2009 | Nguyen et al. |
| 2009/0134895 | A1 | 5/2009 | Miller |
| 2009/0166082 | A1 | 7/2009 | Liu et al. |
| 2009/0176400 | A1 | 7/2009 | Davis et al. |
| 2009/0205194 | A1 | 8/2009 | Semba et al. |
| 2009/0215309 | A1 | 8/2009 | Mongold et al. |
| 2009/0227141 | A1 | 9/2009 | Pan |
| 2009/0239395 | A1 | 9/2009 | Cohen et al. |
| 2009/0247012 | A1 | 10/2009 | Pan |
| 2009/0269971 | A1 | 10/2009 | Tamura et al. |
| 2009/0291593 | A1 | 11/2009 | Atkinson et al. |
| 2009/0291596 | A1 | 11/2009 | Miyazoe |
| 2009/0305533 | A1 | 12/2009 | Feldman et al. |
| 2009/0311908 | A1 | 12/2009 | Fogg et al. |
| 2010/0009571 | A1 | 1/2010 | Scherer et al. |
| 2010/0018738 | A1 | 1/2010 | Chen et al. |
| 2010/0078738 | A1 | 4/2010 | Chambers et al. |
| 2010/0081302 | A1 | 4/2010 | Atkinson et al. |
| 2010/0087084 | A1 | 4/2010 | George |
| 2010/0099299 | A1 | 4/2010 | Moriyama et al. |
| 2010/0112850 | A1 | 5/2010 | Rao et al. |
| 2010/0144167 | A1 | 6/2010 | Fedder et al. |
| 2010/0144168 | A1 | 6/2010 | Glover et al. |
| 2010/0144175 | A1 | 6/2010 | Helster et al. |
| 2010/0144201 | A1 | 6/2010 | Defibaugh et al. |
| 2010/0144203 | A1 | 6/2010 | Glover et al. |
| 2010/0177489 | A1 | 7/2010 | Yagisawa |
| 2010/0183141 | A1 | 7/2010 | Arai et al. |
| 2010/0203768 | A1 | 8/2010 | Kondo et al. |
| 2010/0221951 | A1 | 9/2010 | Pepe et al. |
| 2010/0248544 | A1 | 9/2010 | Xu et al. |
| 2010/0291806 | A1 | 11/2010 | Minich et al. |
| 2010/0294530 | A1 | 11/2010 | Atkinson et al. |
| 2011/0003509 | A1 | 1/2011 | Gailus |
| 2011/0034075 | A1 | 2/2011 | Feldman et al. |
| 2011/0067237 | A1 | 3/2011 | Cohen et al. |
| 2011/0074213 | A1 | 3/2011 | Schaffer et al. |
| 2011/0081114 | A1 | 4/2011 | Togami |
| 2011/0100694 | A1 | 5/2011 | Regnier et al. |
| 2011/0104948 | A1 | 5/2011 | Girard, Jr. et al. |
| 2011/0130038 | A1 | 6/2011 | Cohen et al. |
| 2011/0136387 | A1 | 6/2011 | Matsuura et al. |
| 2011/0177699 | A1 | 7/2011 | Crofoot et al. |
| 2011/0212632 | A1 | 9/2011 | Stokoe et al. |
| 2011/0212633 | A1 | 9/2011 | Regnier et al. |
| 2011/0212649 | A1 | 9/2011 | Stokoe et al. |
| 2011/0212650 | A1 | 9/2011 | Amleshi et al. |
| 2011/0223807 | A1 | 9/2011 | Jeon et al. |
| 2011/0230095 | A1 | 9/2011 | Atkinson et al. |
| 2011/0230096 | A1 | 9/2011 | Atkinson et al. |
| 2011/0230104 | A1 | 9/2011 | Lang et al. |
| 2011/0263156 | A1 | 10/2011 | Ko |
| 2011/0287663 | A1 | 11/2011 | Gailus et al. |
| 2011/0300757 | A1 | 12/2011 | Regnier et al. |
| 2011/0300760 | A1 | 12/2011 | Ngo |
| 2012/0003848 | A1 | 1/2012 | Casher et al. |
| 2012/0034798 | A1 | 2/2012 | Khemakhem et al. |
| 2012/0034820 | A1 | 2/2012 | Lang et al. |
| 2012/0040563 | A1 | 2/2012 | Wang et al. |
| 2012/0052712 | A1 | 3/2012 | Wang |
| 2012/0058665 | A1 | 3/2012 | Zerebilov |
| 2012/0058670 | A1 | 3/2012 | Regnier et al. |
| 2012/0077369 | A1 | 3/2012 | Andersen |
| 2012/0077380 | A1 | 3/2012 | Minich et al. |
| 2012/0094536 | A1 | 4/2012 | Khilchenko et al. |
| 2012/0135643 | A1 | 5/2012 | Lange et al. |
| 2012/0148198 | A1 | 6/2012 | Togami et al. |
| 2012/0156929 | A1 | 6/2012 | Manter et al. |
| 2012/0156938 | A1 | 6/2012 | Zhang |
| 2012/0164860 | A1 | 6/2012 | Wang |
| 2012/0171890 | A1 | 7/2012 | Kurachi |
| 2012/0184136 | A1 | 7/2012 | Ritter |
| 2012/0184145 | A1 | 7/2012 | Zeng |
| 2012/0202363 | A1 | 8/2012 | McNamara et al. |
| 2012/0202370 | A1 | 8/2012 | Mulfinger et al. |
| 2012/0202386 | A1 | 8/2012 | McNamara et al. |
| 2012/0214344 | A1 | 8/2012 | Cohen et al. |
| 2012/0221758 | A1 | 8/2012 | Hunkins et al. |
| 2012/0252232 | A1 | 10/2012 | Buck et al. |
| 2012/0329294 | A1 | 12/2012 | Raybold et al. |
| 2013/0012038 | A1 | 1/2013 | Kirk et al. |
| 2013/0017715 | A1 | 1/2013 | Laarhoven et al. |
| 2013/0017733 | A1 | 1/2013 | Kirk et al. |
| 2013/0034999 | A1 | 2/2013 | Szczesny et al. |
| 2013/0040482 | A1 | 2/2013 | Ngo et al. |
| 2013/0065454 | A1 | 3/2013 | Milbrand Jr. |
| 2013/0078870 | A1 | 3/2013 | Milbrand, Jr. |
| 2013/0084744 | A1 | 4/2013 | Zerebilov et al. |
| 2013/0092429 | A1 | 4/2013 | Ellison |
| 2013/0109232 | A1 | 5/2013 | Paniaqua |
| 2013/0143420 | A1 | 6/2013 | Light et al. |
| 2013/0143442 | A1 | 6/2013 | Cohen et al. |
| 2013/0164970 | A1 | 6/2013 | Regnier et al. |
| 2013/0196553 | A1 | 8/2013 | Gailus |
| 2013/0210246 | A1 | 8/2013 | Davis et al. |
| 2013/0223036 | A1 | 8/2013 | Herring et al. |
| 2013/0225006 | A1 | 8/2013 | Khilchenko et al. |
| 2013/0237092 | A1 | 9/2013 | Rubens |
| 2013/0270000 | A1 | 10/2013 | Buck et al. |
| 2013/0273781 | A1 | 10/2013 | Buck et al. |
| 2013/0288513 | A1 | 10/2013 | Masubuchi et al. |
| 2013/0288521 | A1 | 10/2013 | McClellan et al. |
| 2013/0288525 | A1 | 10/2013 | McClellan et al. |

(56) References Cited

U.S. PATENT DOCUMENTS

2013/0288539 A1 10/2013 McClellan et al.
2013/0309906 A1 11/2013 Geest
2013/0340251 A1 12/2013 Regnier et al.
2014/0004724 A1 1/2014 Cartier, Jr. et al.
2014/0004726 A1 1/2014 Cartier, Jr. et al.
2014/0004746 A1 1/2014 Cartier, Jr. et al.
2014/0035755 A1 2/2014 Ward
2014/0041937 A1 2/2014 Lloyd et al.
2014/0057475 A1 2/2014 Tohjo
2014/0057493 A1 2/2014 De Geest et al.
2014/0057494 A1 2/2014 Cohen
2014/0057498 A1 2/2014 Cohen
2014/0065883 A1 3/2014 Cohen et al.
2014/0073174 A1 3/2014 Yang
2014/0073181 A1 3/2014 Yang
2014/0098508 A1 4/2014 Dunham
2014/0099844 A1 4/2014 Dunham
2014/0154912 A1 6/2014 Hirschy
2014/0193993 A1 7/2014 Meng
2014/0199885 A1 7/2014 Vinther et al.
2014/0242844 A1 8/2014 Wanha et al.
2014/0273551 A1 9/2014 Resendez et al.
2014/0273557 A1 9/2014 Cartier, Jr. et al.
2014/0273627 A1 9/2014 Cartier, Jr. et al.
2014/0273641 A1 9/2014 Light et al.
2014/0286613 A1 9/2014 Ito et al.
2014/0287627 A1 9/2014 Cohen
2014/0295680 A1 10/2014 YuQiang et al.
2014/0302706 A1 10/2014 YuQiang et al.
2014/0308852 A1 10/2014 Gulla
2014/0334792 A1 11/2014 Bragg
2014/0335707 A1 11/2014 Johnescu et al.
2014/0335736 A1 11/2014 Regnier et al.
2015/0056856 A1 2/2015 Atkinson et al.
2015/0072561 A1 3/2015 Schmitt et al.
2015/0072562 A1 3/2015 Little et al.
2015/0079814 A1 3/2015 Tamai
2015/0079829 A1 3/2015 Brodsgaard
2015/0079845 A1 3/2015 Wanha et al.
2015/0093083 A1 4/2015 Tsai et al.
2015/0132990 A1 5/2015 Nong Chou et al.
2015/0147895 A1 5/2015 Hanna
2015/0180578 A1 6/2015 Leigh et al.
2015/0194751 A1 7/2015 Herring
2015/0200483 A1 7/2015 Martin et al.
2015/0200496 A1 7/2015 Simpson et al.
2015/0207247 A1 7/2015 Regnier et al.
2015/0236450 A1 8/2015 Davis
2015/0236451 A1 8/2015 Cartier, Jr. et al.
2015/0236452 A1 8/2015 Cartier, Jr. et al.
2015/0255926 A1 9/2015 Paniagua
2015/0280351 A1 10/2015 Bertsch
2015/0280368 A1 10/2015 Bucher
2015/0288110 A1 10/2015 Tanguchi et al.
2015/0303608 A1 10/2015 Zerebilov et al.
2015/0333460 A1 11/2015 Regnier et al.
2015/0357736 A1 12/2015 Tran et al.
2015/0357747 A1 12/2015 Filipon et al.
2015/0357761 A1 12/2015 Wanha et al.
2016/0004022 A1 1/2016 Ishii
2016/0013594 A1 1/2016 Costello et al.
2016/0013596 A1 1/2016 Regnier
2016/0028189 A1 1/2016 Resendez et al.
2016/0049746 A1 2/2016 Gross
2016/0054527 A1 2/2016 Tang et al.
2016/0104956 A1 4/2016 Santos et al.
2016/0104990 A1 4/2016 Laurx et al.
2016/0111825 A1 4/2016 Wanha et al.
2016/0131859 A1 5/2016 Ishii et al.
2016/0141807 A1 5/2016 Gailus et al.
2016/0149343 A1 5/2016 Atkinson et al.
2016/0149362 A1 5/2016 Ritter et al.
2016/0150633 A1 5/2016 Cartier, Jr.
2016/0150639 A1 5/2016 Gailus et al.
2016/0150645 A1 5/2016 Gailus et al.
2016/0156133 A1 6/2016 Masubuchi et al.
2016/0172803 A1 6/2016 Tamai
2016/0174412 A1 6/2016 Karaaslan et al.
2016/0181713 A1 6/2016 Peloza et al.
2016/0181732 A1 6/2016 Laurx et al.
2016/0190747 A1 6/2016 Regnier et al.
2016/0197423 A1 7/2016 Regnier
2016/0211598 A1 7/2016 Costello et al.
2016/0211623 A1 7/2016 Sharf et al.
2016/0218455 A1 7/2016 Sayre et al.
2016/0233598 A1 8/2016 Wittig
2016/0268714 A1 9/2016 Wanha et al.
2016/0268739 A1 9/2016 Zerebilov et al.
2016/0274316 A1 9/2016 Verdiell
2016/0308296 A1 10/2016 Pitten et al.
2016/0315425 A1 10/2016 Nishimori et al.
2016/0322770 A1 11/2016 Zerebilov
2016/0336692 A1 11/2016 Champion et al.
2016/0344141 A1 11/2016 Cartier, Jr. et al.
2017/0025204 A1 1/2017 Chapman et al.
2017/0025783 A1 1/2017 Astbury et al.
2017/0033478 A1 2/2017 Wanha et al.
2017/0042070 A1 2/2017 Baumler et al.
2017/0047692 A1 2/2017 Cartier, Jr. et al.
2017/0054234 A1 2/2017 Kachlic
2017/0054250 A1 2/2017 Kim et al.
2017/0077643 A1 3/2017 Zbinden et al.
2017/0093093 A1 3/2017 Cartier, Jr. et al.
2017/0098901 A1 4/2017 Regnier
2017/0162960 A1 6/2017 Wanha et al.
2017/0194721 A1 7/2017 Fan et al.
2017/0222374 A1 8/2017 Saito et al.
2017/0285282 A1 10/2017 Regnier et al.
2017/0294743 A1 10/2017 Gailus et al.
2017/0302011 A1 10/2017 Wanha et al.
2017/0338595 A1 11/2017 Girard, Jr.
2017/0365942 A1 12/2017 Regnier
2017/0365943 A1 12/2017 Wanha et al.
2018/0006406 A1 1/2018 Craton
2018/0006416 A1 1/2018 Lloyd et al.
2018/0026413 A1 1/2018 Dambach et al.
2018/0034175 A1 2/2018 Lloyd et al.
2018/0034190 A1 2/2018 Ngo
2018/0040989 A1 2/2018 Chen
2018/0062323 A1 3/2018 Kirk et al.
2018/0089966 A1 3/2018 Ward
2018/0109043 A1 4/2018 Provencher et al.
2018/0145438 A1 5/2018 Cohen
2018/0212385 A1 7/2018 Little
2018/0219331 A1 8/2018 Cartier, Jr. et al.
2018/0219332 A1 8/2018 Brungard et al.
2018/0269612 A1 9/2018 Pitten et al.
2018/0278000 A1 9/2018 Regnier
2018/0287280 A1 10/2018 Ratkovic
2018/0294592 A1 10/2018 Huang et al.
2018/0309214 A1 10/2018 Lloyd et al.
2018/0366880 A1 12/2018 Zerebilov et al.
2019/0013617 A1 1/2019 Ayzenberg et al.
2019/0013625 A1 1/2019 Gailus et al.
2019/0020155 A1 1/2019 Trout et al.
2019/0044284 A1 2/2019 Dunham
2019/0115677 A1 4/2019 Kachlic
2019/0157812 A1 5/2019 Gailus et al.
2019/0173236 A1 6/2019 Provencher et al.
2019/0181582 A1 6/2019 Beltran et al.
2019/0191094 A1 6/2019 Khoe et al.
2019/0260147 A1 8/2019 Pitten et al.
2019/0267732 A1 8/2019 Buck et al.
2020/0028302 A1 1/2020 Winey
2020/0076455 A1 3/2020 Sharf
2020/0091637 A1 3/2020 Scholeno et al.
2020/0142142 A1 5/2020 Luo et al.
2020/0203892 A1 6/2020 Hsu et al.
2020/0220289 A1 7/2020 Scholeno et al.
2020/0227850 A1 7/2020 Do et al.
2020/0227851 A1 7/2020 Do et al.
2020/0244025 A1 7/2020 Winey et al.
2020/0274267 A1 8/2020 Zerebilov
2020/0274295 A1 8/2020 Briant

(56) References Cited

U.S. PATENT DOCUMENTS

| | | | |
|---|---|---|---|
| 2020/0274301 | A1 | 8/2020 | Manter et al. |
| 2021/0021085 | A1 | 1/2021 | Diaz et al. |
| 2021/0091496 | A1 | 3/2021 | Cartier, Jr. et al. |
| 2021/0098927 | A1 | 4/2021 | Si et al. |
| 2021/0234291 | A1 | 7/2021 | Zerebilov |
| 2021/0305731 | A1 | 9/2021 | Klein et al. |
| 2021/0351547 | A1 | 11/2021 | Little et al. |
| 2021/0384691 | A1 | 12/2021 | Winey et al. |
| 2021/0399455 | A1 | 12/2021 | Wang et al. |
| 2022/0013960 | A1 | 1/2022 | Guetig et al. |
| 2022/0013962 | A1 | 1/2022 | Gailus et al. |
| 2022/0094111 | A1 | 3/2022 | Duan et al. |
| 2022/0158371 | A1 | 5/2022 | Zerebilov et al. |
| 2022/0173550 | A1 | 6/2022 | Liu et al. |
| 2022/0224057 | A1 | 7/2022 | Diaz et al. |
| 2022/0287205 | A1 | 9/2022 | Huang et al. |
| 2022/0352675 | A1 | 11/2022 | Zerebilov et al. |
| 2023/0006390 | A1 | 1/2023 | Si et al. |
| 2023/0299518 | A1 | 9/2023 | Zerebilov et al. |
| 2023/0307854 | A1 | 9/2023 | Pritchard et al. |
| 2023/0352866 | A1 | 11/2023 | Cartier, Jr. et al. |
| 2023/0352895 | A1 | 11/2023 | Winey et al. |
| 2024/0030655 | A1 | 1/2024 | Diaz et al. |
| 2024/0106140 | A1 | 3/2024 | Xu et al. |
| 2024/0145958 | A1 | 5/2024 | Fan et al. |
| 2024/0258723 | A1 | 8/2024 | Zerebilov et al. |
| 2024/0313478 | A1 | 9/2024 | Diaz et al. |

FOREIGN PATENT DOCUMENTS

| | | | | | |
|---|---|---|---|---|---|
| CN | 101312275 | A | | 11/2008 | |
| CN | 101330172 | A | | 12/2008 | |
| CN | 101330173 | A | | 12/2008 | |
| CN | 101364692 | A | | 2/2009 | |
| CN | 201229997 | Y | | 4/2009 | |
| CN | 201294322 | Y | * | 8/2009 | ............. H01R 43/16 |
| CN | 101752700 | A | | 6/2010 | |
| CN | 201562814 | U | | 8/2010 | |
| CN | 201601286 | U | * | 10/2010 | |
| CN | 102106046 | A | | 6/2011 | |
| CN | 102160245 | A | | 8/2011 | |
| CN | 201956529 | U | | 8/2011 | |
| CN | 102377053 | A | | 3/2012 | |
| CN | 102570152 | A | | 7/2012 | |
| CN | 102598430 | A | | 7/2012 | |
| CN | 202564699 | U | | 11/2012 | |
| CN | 102823073 | A | | 12/2012 | |
| CN | 202678544 | U | | 1/2013 | |
| CN | 102986091 | A | | 3/2013 | |
| CN | 103140994 | A | | 6/2013 | |
| CN | 103250306 | A | | 8/2013 | |
| CN | 103682705 | A | | 3/2014 | |
| CN | 103969768 | A | | 8/2014 | |
| CN | 104025393 | A | | 9/2014 | |
| CN | 104244655 | A | | 12/2014 | |
| CN | 204030038 | U | | 12/2014 | |
| CN | 104518363 | | | 4/2015 | |
| CN | 104779467 | A | | 7/2015 | |
| CN | 105051978 | A | | 11/2015 | |
| CN | 105449444 | A | * | 3/2016 | ......... H01R 13/6593 |
| CN | 105612671 | A | | 5/2016 | |
| CN | 105811154 | A | | 7/2016 | |
| CN | 105826740 | A | | 8/2016 | |
| CN | 106030925 | A | | 10/2016 | |
| CN | 106104933 | A | | 11/2016 | |
| CN | 107111075 | A | | 8/2017 | |
| CN | 107408769 | A | | 11/2017 | |
| CN | 107454794 | A | | 12/2017 | |
| CN | 107645072 | A | | 1/2018 | |
| CN | 108028481 | A | | 5/2018 | |
| CN | 108475891 | A | | 8/2018 | |
| CN | 108713355 | | | 10/2018 | |
| CN | 109273932 | A | | 1/2019 | |
| CN | 109980386 | A | | 7/2019 | |
| CN | 111769395 | A | | 10/2020 | |
| CN | 111769396 | A | | 10/2020 | |
| CN | 212412345 | U | | 1/2021 | |
| CN | 212571566 | U | | 2/2021 | |
| CN | 213151165 | U | | 5/2021 | |
| CN | 112993659 | A | | 6/2021 | |
| CN | 113078510 | A | | 7/2021 | |
| CN | 214100162 | U | | 8/2021 | |
| CN | 113422243 | A | | 9/2021 | |
| CN | 215184602 | U | | 12/2021 | |
| CN | 115347395 | A | | 11/2022 | |
| EP | 2 169 770 | A2 | | 3/2010 | |
| JP | H0541265 | A | * | 2/1993 | |
| JP | 2010-266729 | A | | 11/2010 | |
| JP | 2011-018651 | A | | 1/2011 | |
| JP | 2012-516021 | A | | 7/2012 | |
| JP | 2014-195061 | A | | 10/2014 | |
| JP | 2016-528688 | A | | 9/2016 | |
| JP | 6193595 | B2 | | 9/2017 | |
| JP | 6599548 | B2 | | 10/2019 | |
| JP | 1656986 | S | | 4/2020 | |
| JP | 1668637 | S | | 9/2020 | |
| JP | 1668730 | S | | 9/2020 | |
| KR | 10-2010-0055197 | A | | 5/2010 | |
| KR | 10-1425931 | B1 | | 8/2014 | |
| KR | 10-2015-0067010 | A | | 6/2015 | |
| KR | 10-2015-0101020 | A | | 9/2015 | |
| KR | 10-2016-0038192 | A | | 4/2016 | |
| KR | 10-2016-0076334 | A | | 6/2016 | |
| TW | 200910710 | A | | 3/2009 | |
| TW | M357771 | U | | 5/2009 | |
| TW | M403134 | U | | 5/2011 | |
| TW | 201320504 | A | | 5/2013 | |
| TW | I446657 | B | | 7/2014 | |
| TW | I465333 | B | | 12/2014 | |
| TW | 201521295 | A | | 6/2015 | |
| TW | I489002 | B | | 6/2015 | |
| TW | 201607174 | A | | 2/2016 | |
| TW | 201637298 | A | | 10/2016 | |
| TW | I600222 | B | | 9/2017 | |
| TW | I645628 | B | | 12/2018 | |
| TW | D209874 | S1 | | 2/2021 | |
| WO | WO 2008/124057 | A1 | | 10/2008 | |
| WO | WO 2010/039188 | A1 | | 4/2010 | |
| WO | WO 2012/078434 | A2 | | 6/2012 | |
| WO | WO 2013/006592 | A2 | | 1/2013 | |
| WO | WO 2014/146134 | A1 | | 9/2014 | |
| WO | WO 2015/013430 | A1 | | 1/2015 | |
| WO | WO 2015/112717 | A1 | | 7/2015 | |
| WO | WO 2017/015470 | A1 | | 1/2017 | |
| WO | WO 2017/123574 | | | 7/2017 | |
| WO | WO 2017/164418 | A1 | | 9/2017 | |
| WO | WO 2017/218771 | A1 | | 12/2017 | |
| WO | WO 2018/118738 | A1 | | 6/2018 | |
| WO | WO 2018/226805 | A1 | | 12/2018 | |
| WO | WO 2019/195319 | | | 10/2019 | |
| WO | WO 2021/070273 | A1 | | 4/2021 | |

OTHER PUBLICATIONS

Cartier et al., High Speed Electronic System With Midboard Cable Connector, U.S. Appl. No. 18/929,264, filed Oct. 28, 2024.

[No Author Listed], Amphenol TCS expands the Xcede Platform with 85 Ohm Connectors and High-Speed Cable Solutions. Press Release. Published Feb. 25, 2009. http://www.amphenol.com/about/news_archive/2009/58 [Retrieved on Mar. 26, 2019 from Wayback Machine]. 4 pages.

[No Author Listed], Agilent. Designing Scalable 10G Backplane Interconnect Systems Utilizing Advanced Verification Methodologies. White Paper, Published May 5, 2012. 24 pages.

[No Author Listed], Difference Between Weld Metal and Heat Affected Zone (HAZ). Minaprem.com. 2021. 7 pages. URL:http://www.difference.minaprem.com/joining/difference-between-weld-metal-and-heat-affected-zone-haz [date retrieved Dec. 20, 2021].

[No Author Listed], Hitachi Cable America Inc. Direct Attach Cables. 8 pages. Retrieved Aug. 10, 2017 from http://www.hca.hitachi-cable.com/products/hca/catalog/pdfs/direct-attach-cable-assemblies.pdf [last accessed Mar. 6, 2019].

(56) References Cited

OTHER PUBLICATIONS

[No Author Listed], INF-8628 Specification for QSFP-DD 8X Transceiver (QSFP Double Density) Rev 0.0 Jun. 27, 2016. SNIA SFF TWG Technology Affiliate. 1 page.
[No Author Listed], SFF-8663 Specification for QSFP+ 28 GB/s Cage (Style A) Rev 1.7. Oct. 19, 2017. SNIA SFF TWG Technology Affiliate. 18 pages.
[No Author Listed], Specification for Quad Small Form Factor Pluggable Module 112. QSFP112 Published Specification Rev. 2.0. QSFP112 Multi-Source Agreement. Jan. 22, 2022. 55 pages.
[No Author Listed], What is the Heat Affected Zone (HAZ)? TWI Ltd. 2021. 8 pages. URL:https://www.twi-global.com/technical-knowledge/faqs/what-is-the-heat-affected-zone [date retrieved Dec. 20, 2021].
Cartier et al., High Speed Electronic System With Midboard Cable Connector, U.S. Appl. No. 18/347,820, filed Jul. 6, 2023.
Diaz et al., Controlled-Impedance Compliant Cable Termination, U.S. Appl. No. 18/321,754, filed May 22, 2023.
Lehto et al, Characterisation of local grain size variation of welded structural steel. Weld World. 2016;60:673-688. 16 pages. URL:https://link.springer.com/content/pdf/10.1007/s40194-016-0318-8.pdf.
Lloyd et al., High Speed Bypass Cable Assembly, U.S. Appl. No. 15/271,903, filed Sep. 21, 2016.
Lloyd et al., High Speed Bypass Cable Assembly, U.S. Appl. No. 15/715,939, filed Sep. 26, 2017.
Palkert (ed), QSFP-DD Overview. Mar. 14, 2017. 19 pages. URL:http://www.qsfp-dd.com.
Winey et al., I/O Connector Configured for Cabled Connection to the Midboard, U.S. Appl. No. 18/346,172, filed Jun. 30, 2023.
Zerebilov et al., I/O Connector Configured for Cable Connection to a Midboard, U.S. Appl. No. 18/136,827, filed Apr. 19, 2023.
Diaz et al., Controlled-Impedance Compliant Cable Termination, U.S. Appl. No. 18/671,831, filed May 22, 2024.

* cited by examiner

HIGH FREQUENCY MIDBOARD CONNECTOR

RELATED APPLICATIONS

This application is a continuation of U.S. application Ser. No. 17/160,229, filed Jan. 27, 2021, which claims the benefit under 35 U.S.C. § 119(e) of U.S. Provisional Application No. 62/966,892, filed Jan. 28, 2020, which are hereby incorporated by reference in their entirety.

FIELD

Disclosed embodiments are related to near midboard connectors with high frequency performance, as well as related methods of use of such midboard connectors.

BACKGROUND

Electrical connectors are used in many electronic systems. It is generally easier and more cost effective to manufacture a system as separate electronic subassemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

A known arrangement for joining several printed circuit boards is to have one printed circuit board serve as a backplane. Other printed circuit boards, called "daughterboards," "daughtercards," or "midboards" may be connected through the backplane. A backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane. The daughtercards may plug into the backplane at a right angle. The connectors used for these applications may therefore include a right angle bend and are often called "right angle connectors."

Connectors may also be used in other configurations for interconnecting printed circuit boards. Sometimes, one or more smaller printed circuit boards may be connected to another larger printed circuit board. In such a configuration, the larger printed circuit board may be called a "motherboard" and the printed circuit boards connected to it may be called daughterboards. Also, boards of the same size or similar sizes may sometimes be aligned in parallel. Connectors used in these applications are often called "stacking connectors" or "mezzanine connectors."

Connectors may also be used to enable signals to be routed to or from an electronic device. A connector, called an "I/O connector," may be mounted to a printed circuit board, usually at an edge of the printed circuit board. That connector may be configured to receive a plug at one end of a cable, such that the cable is connected to the printed circuit board through the I/O connector. The other end of the cable may be connected to another electronic device.

Cables have also been used to make connections within the same electronic device. The cables may be used to route signals from an I/O connector to a processor assembly that is located at the interior of printed circuit board, away from the edge at which the I/O connector is mounted. In other configurations, both ends of a cable may be connected to the same printed circuit board. The cables can be used to carry signals between components mounted to the printed circuit board near where each end of the cable connects to the printed circuit board.

Routing signals through a cable, rather than through a printed circuit board, may be advantageous because the cables provide signal paths with high signal integrity, particularly for high frequency signals, such as those above 40 Gbps using an NRZ protocol or greater than 50 Gbps using a PAM4 protocol. Known cables have one or more signal conductors, which are surrounded by a dielectric material, which in turn is surrounded by a conductive layer. A protective jacket, often made of plastic, may surround these components. Additionally the jacket or other portions of the cable may include fibers or other structures for mechanical support.

One type of cable, referred to as a "twinax cable," is constructed to support transmission of a differential signal and has a balanced pair of signal wires embedded in a dielectric and encircled by a conductive layer. The conductive layer is usually formed using foil, such as aluminized Mylar. The twinax cable can also have a drain wire. Unlike a signal wire, which is generally surrounded by a dielectric, the drain wire may be uncoated so that it contacts the conductive layer at multiple points over the length of the cable. At an end of the cable, where the cable is to be terminated to a connector or other terminating structure, the protective jacket, dielectric and the foil may be removed, leaving portions of the signal wires and the drain wire exposed at the end of the cable. These wires may be attached to a terminating structure, such as a connector. The signal wires may be attached to conductive elements serving as mating contacts in the connector structure. The foil may be attached to a ground conductor in the terminating structure, either directly or through the drain wire, if present. In this way, any ground return path may be continued from the cable to the terminating structure.

High speed, high bandwidth cables and connectors have been used to route signals to or from processors and other electrical components that process a large number of high speed, high bandwidth signals. These cables and connectors reduce the attenuation of the signals passing to or from these components relative to what might occur were the same signals routed through a printed circuit board.

SUMMARY

In some embodiments, a method of constructing a connector includes stamping a terminal assembly. The terminal assembly includes a base extending in a first plane, a plurality of connected terminals having a first portion parallel to the first plane, and a second portion disposed at an angle relative to the first plane, a first wing including first projection receptacle, and a second wing including a second projection receptacle. The method also includes overmolding portions of the plurality of connected terminals with a dielectric material, and severing each of the plurality of connected terminals from one another.

In some embodiments, a method of constructing a connector includes stamping a terminal assembly, where the terminal assembly includes a cable clamp plate and a plurality of terminals extending from the cable clamp plate. The method also includes overmolding portions of the plurality of terminals with a dielectric material, and, for a portion of the plurality of terminals, severing a connection between the terminal and each of the other of the plurality of electrically connected terminals.

In some embodiments, a method of making an electrical connection includes moving a first connector in a first direction relative to a second connector, bringing the plurality of first connector terminals into contact with a plurality of terminals of the second connector, pressing the plurality of first connector terminals against the plurality of second connector terminals so as to bias the first connector in a second direction opposite the first direction, allowing the first connector to move in the second direction, and restraining motion in the second direction of the first connector relative to the second connector by engaging features of the first connector to features of the second connector.

In some embodiments, an electrical connector includes a base, a plurality of terminals, where each of the plurality of terminals includes a first portion aligned with the base and a second portion transverse to the base, and where the terminals are integrally formed on the same piece of metal. The electrical connector also includes a dielectric material attached to the plurality of terminals and the base such that the terminals are physically supported relative to the base by dielectric material.

In some embodiments an electronic assembly includes a substrate having at least one electronic component mounted thereto, and a first connector including a first connector housing having a bottom face disposed in a first plane, a plurality of first terminals disposed in the first connector housing and extending in a first direction angled relative to the first plane at an angle between approximately 20 and 55 degrees. The electronic assembly also includes a second connector mounted to the substrate, the second connector including a base including a portion disposed in a second plane and facing the substrate, a first wing extending from the base, a second wing extending from the base, and a plurality of second terminals. Each of the plurality of terminals includes a first portion extending in the second plane and a second portion angled relative to the second plane at an angle between 10 and 40 degrees. The first connector is mated to the second connector such that the plurality of first terminals press against respective ones of the plurality of second terminals. The plurality of first terminals and/or the plurality of second terminals are elastically deformed so as to bias the first connector housing away from the base of the second connector.

In some embodiments, an electrical connector includes a base, and a first wing and an opposing second wing extending perpendicularly from the base so as to define an opening between the first and second wings, where the base and the first wing and the second wing include integral portions of a sheet of metal. The electrical connector also includes a plurality of terminals, where each of the plurality of terminals includes a first portion aligned with the base and a second portion transverse to the first portion extending into the opening. The electrical connector also includes dielectric material attached to the plurality of terminals and the base such that the plurality of terminals are physically supported relative to the base by dielectric material.

In some embodiments, an electrical connector includes a cable clamp plate, a plurality of terminals aligned with the cable clamp plate, dielectric material attached to the plurality of terminals and the cable clamp plate such that the plurality of terminals are physically supported relative to the cable clamp plate by dielectric material, and a plurality of cables disposed on the cable clamp plate.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
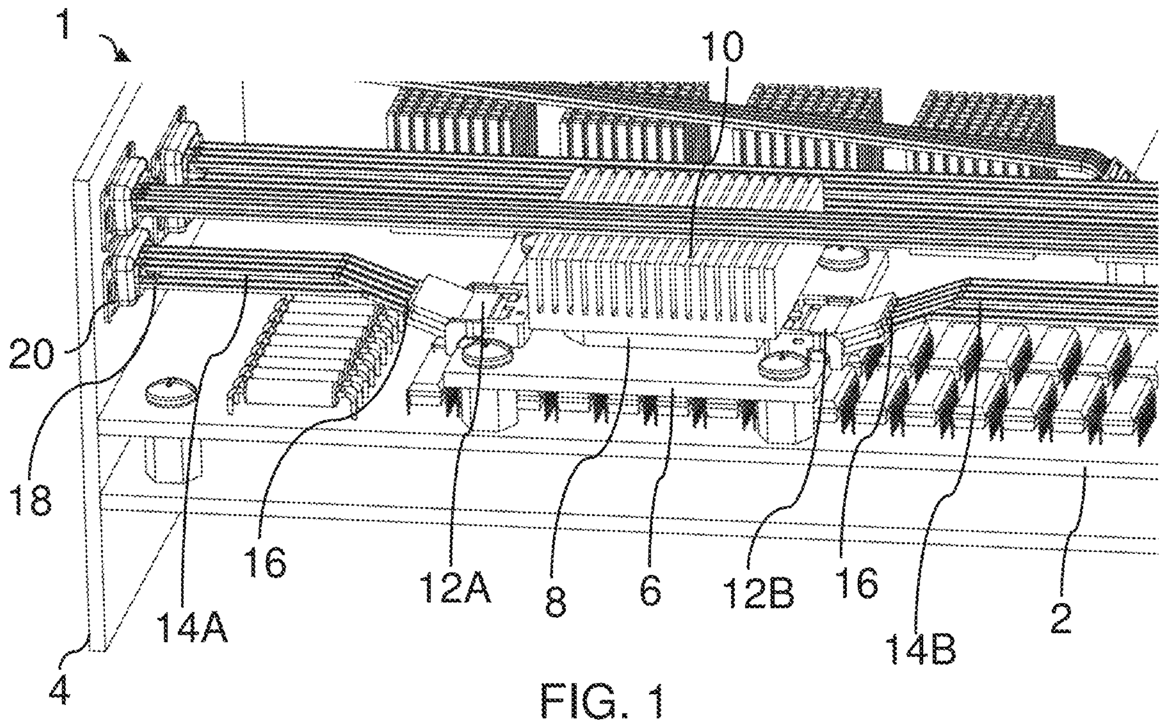
FIG. 1 is a perspective view of a portion of an exemplary embodiment of an electronic system with cables routing signals between I/O connectors and a midboard location.

The inventors have recognized and appreciated designs for cabled interconnections that enable efficient manufacture of small, high performance electronic devices, such as servers and switches. These cabled interconnections support a high density of high-speed signal connections to processors and other components in the midboard region of the electronic device. A board connector may be mounted near these components and a cable connector may be mated to it. The other end of cables terminated at the cabled connector may be connected to an I/O connector or at another location remote from the midboard such that the cables may carry high-speed signals, with high signal integrity, over long distances.

Additionally, the inventors have recognized and appreciated designs for cable connectors and mating board connectors that are simple to manufacture with low tolerances and reduced tolerance stack. Furthermore, the inventors have recognized and appreciated designs for cable connectors and mating board connectors that shorten terminal stubs which can cause stub resonance and reduce cable frequency bandwidth. These connectors may nonetheless provide wipe of the mating terminals, which can remove oxide and other contaminates from the terminals, increasing the reliability of the interconnections in operation. The board and cable connectors may have mating terminals that deflect when the board and cable connector are pressed together, in a mating direction. The deflection may generate a backwards force, in a direction opposite the mating direction. Backward motion of the cable connector relative to the board connector is restrained by engagement features on the cable connector and/or board connector such that the relative position of the terminals, and resulting stub length, is set by the engagement features.

The board connector may support a surface mount interface to a substrate (e.g., a PCB or semiconductor chip substrate) carrying a processor or other components processing a large number of high speed signals. The connector may incorporate features that provide a large number of terminals in a relatively small volume. In some embodiments, the connector may support mounting on the top and bottom of a daughtercard or other substrate separated by a short distance from a motherboard, providing a high density of interconnections.

The cable connector may terminate multiple cables with a terminal for each conductor in each cable designed as a signal conductor and one or more terminals coupled to a grounding structure within the cable. For drainless twinax cable, for example, the connector may have, for each cable, two signal terminals electrically coupled to the cable conductors and a ground terminal coupled to a shield around the cable conductors. The terminals may be positioned such that the ground terminals are between adjacent pairs of signal terminals.

According to exemplary embodiments described herein, any suitably sized cable conductors may be employed and coupled to a suitably sized terminal. In some embodiments, cable conductors may have a diameter less than or equal to 24 AWG. In other embodiments, cable conductors may have a diameter less than or equal to 30 AWG.

A cable connector may be simply constructed through the use of modular terminal assemblies. Each terminal assembly may contain a plurality of terminals and an overmolded dielectric portion which physically supports the terminals. Terminals coupled to the shield of the cable may be electrically connected to one another. For example, in some embodiments, a ground conductor may be attached, such as by welding or soldering, to a ground portion of the terminals. The terminal assemblies may be aligned in one or more rows, creating an array of terminals. The terminal assemblies may be tightly spaced without walls of a connector housing separating them, as each terminal subassembly may include a cable connector plate, which aids in making ground connections to the cable shield and provides mechanical support for the terminal subassembly. The cable connector plate may engage a connector housing, holding the terminal assembly securely in the housing, without additional support structures, further increasing the density of the array of terminals.

In some embodiments, a board connector may include a terminal assembly. The terminal assembly may be formed by stamping a single piece of metal. All of the components of the connector formed in that stamping operation may be positioned relative to each other with high precision achievable in a stamping operation. The terminal assembly may include a base extending in a first plane, and a plurality of connected terminals having a first portion parallel to the first plane and a second portion disposed at an angle relative to the first plane. The second portion of the terminals may be arranged as a contact tip which extends at an angle (e.g., between 15 and 45 degrees, or between 20 and 30 degrees). The first portion of the terminals may be configured as a solder tail, arranged to be soldered to a contact on a substrate (e.g., PCB).

In some embodiments, the terminal assembly may also include a first wing and a second wing extending perpendicular to the first plane and defining an opening in the board connector into which the cable connector may be inserted. Each of the first wing and second wing may include engagement features, such as at least one projection receptacle configured to receive a corresponding projection of a cable connector. According to some embodiments, the second portions of the terminals may be configured to bias a cable connector away from the opening, and the projection receptacles maybe configured to retain the cable connector in the opening against the biasing force of the second portions. As the terminals, wings, and projection receptacles may be formed by the same stamping die, the distance between the projection receptacles and second portions may have a very low tolerance, such that the length of stubs of the plurality of terminals may be predicted with greater accuracy. Accordingly, the connectors may be designed with the length of the stubs may be reduced, and the bandwidth of the connector correspondingly increased due to a reduced effect of stub resonance.

According to exemplary embodiments described herein, a board connector may be manufactured with a terminal assembly stamped from a single piece of metal, such that tolerances maybe lowered as a result of reducing tolerance stack and the accuracy of bending and puncturing sheet metal (e.g., within ±1 degree of angular tolerance on bends and ±0.25 mm on relative spacing). Accordingly, a method of manufacture of a board connector may begin with stamping a terminal assembly with a die, where the terminal assembly includes a base, a plurality of terminals, a first wing, and a second wing. Next, a dielectric may be overmolded over at least a portion of plurality of terminals and the base, such that the dielectric physically supports the plurality of terminals and holds them in position relative to the base. Once overmolded, at least a portion of the plurality of terminals may be electrically and physically severed from one another. In severing the terminals, a portion of metal interconnecting the terminals (e.g., tie bars) may be removed, so that each of the separated terminals is physically supported and electrically isolated by the dielectric. The resulting board connector may be relatively simple and inexpensive to produce and may retain a low tolerance in positioning of the terminals with respect to the wings, which may include features to position the cable connector with respect to the base, thereby improving bandwidth of the connector.

In some embodiments, a cable connector may include a terminal assembly. The terminal assembly may include a cable clamp plate and a plurality of terminals integral with and extending from the cable clamp plate. The plurality of terminals and a portion of the cable clamp plate may be overmolded with a dielectric material, so that the plurality of terminals are physically supported relative to the cable clamp plate by the dielectric. The terminal assembly may form a row of terminals, effectively disposed in a single plane. The cable connector may include a connector housing having an opening configured to accommodate one or more terminal assemblies. The cable clamp plate may include at least two retaining tabs disposed on opposite side edges of the cable clamp plate which may be received and retained in corresponding tab receptacles of the connector housing.

In some embodiments, the connector housing may have a bottom face disposed in a first plane, and each terminal assembly disposed in the connector housing may be inclined relative to the first plane (e.g., between 30 and 45 degrees). Such an angle may be appropriate to engage inclined terminals of a board connector, such that the terminals of the board connector bias the cable connector away from the board connector. In some embodiments, the connector housing may include at least one projection on each side of the connector housing configured to engage corresponding projection receptacles disposed on a board connector. The projections may be arranged with lead-ins, such that the projections are not secured in the projection receptacles when the cable connector is moved toward the board connector, but are secured in the projection receptacles when the cable connector is moved away from the board connector. In some embodiments, the connector housing may include at least one guide configured to be received in a guide channel of a board connector. According to some embodiments, the guide may be parallel with the terminals and inclined relative to a bottom face of the connector housing, such that the connector housing moves at an incline relative to a board connector base when the guide is engaged with a guide channel.

In some embodiments, a cable clamp plate of a terminal assembly may include one or more strain relief portions where one or more cables may be physically secured to the terminal assembly. In some cases, signal fidelity through a high-bandwidth cable is susceptible to change based on the geometry of the conductors inside of the cable. A crushed cable, for example, may affect the signal fidelity of transmissions through a connector. Accordingly, the strain relief portions of the cable clamp plate may provide regions where the cable clamp plate can deform at a threshold clamping force to mitigate damage to a cable. In some embodiments, an I-shaped slot may be provided on the cable clamp plate for each attached cable. A metal plate (e.g., shield plate) may be used to apply pressure to a plurality of cables and clamp the cable against the cable clamp plate. In some embodiments, up to 100 lbs of force may be used to compress the cable(s) against the cable clamp plate. In other embodiments, a different clamping force may be applied, such as up to 75 lbs or up to 125 lbs, for example.

In some embodiments, a cable connector may include a ground conductor, which may act as a shorting bar interconnecting a ground terminal portion of a plurality of terminals. In some cases, resonance within the operating frequency range of a cable connector may be avoided by reducing the length of segments of ground terminals between connections to a common ground to which other terminals are connected. Accordingly, the ground conductor may shorten the length of segments of ground terminals between connections to a common reference by shorting them together near a contact point, thereby reducing the effects of resonance. In some embodiments, a ground conductor may be laser welded to a ground portion of the plurality of connectors. In some embodiments, the ground conductor may be spaced within 2 mm, such as 1.94 mm or less, from the proximal ends of the beams in the ground terminals, where the beams are connected to a common ground structure. Such an arrangement may be no more than a quarter wavelength of resonances which may interfere with signal fidelity. The ground conductor may nonetheless be sufficiently flexible that the ground terminals may move independently to mate with corresponding terminals in a mating connector.

In some embodiments, a cable connector may be manufactured by stamping structures from a sheet of metal in a manner similar to that of a board connector. In some embodiments, signal terminals and ground structures for a terminal assembly may be stamped with a die from a single piece of metal. Those structures may include a cable clamp plate along with a plurality of terminals extending from the cable clamp plate. The cable clamp plate may include at least two tabs disposed on opposing side edges of the cable clamp plate, as well as strain relief regions defined by an I-shaped slot. A dielectric may be overmolded over the plurality of terminals and the cable clamp portion, such that the plurality of terminals are physically supported by the dielectric. At least a portion of the terminals may then be physically and electrically severed from the cable clamp portion (e.g., by removing tie bars). A ground conductor may be welded or soldered to a ground portion of the plurality of terminals. Cable conductors of one or more cables may be welded or soldered to solder tails of each of the plurality of terminals. The cables may be clamped to the cable clamp portion with a metal shield with an appropriate clamp force. The shield may be attached to the clamp plate, such as by welding or brazing, for example. The terminal assembly including dielectric and ground conductor may be inserted into a connector housing, where the at least two tabs are received in corresponding tab receptacles so that the terminal assembly is secured in the connector housing. The terminal assembly may be disposed in a plane at an inclined relative to a bottom face of the connector housing (e.g., between 20 and 55 degrees, or between 30 and 45 degrees).

In some embodiments, methods of connecting a cable connector and a board connector include aligning a guide of the cable connector and a guide channel of the board connector. The guide may be inserted into the guide channel, so that the cable connector may move in a first direction toward the board connector, or a second direction away from the board connector. The cable connector may be moved in the first direction, and in some embodiments one or more projections of the cable connector may engage a first wing and second wing of the board connector with a lead-in, such that the projections are not caught by the wings and do not inhibit movement in the first direction. The cable connector may be moved further in the first direction until a plurality of cable terminals engage a plurality of board terminals, where the board terminals are disposed at an angle relative to the base of the board connector. The board terminals and/or cable terminals may deflect under force applied to the cable connector, and may also wipe against one another. Once the cable connector has been inserted into the board connector, the cable connector may be released, or the force applied reduced, such that biasing force generated by the plurality of deflected terminals moves the cable connector in the second direction away from the board connector. At a predetermined position, the one or more projections may be received in one or more corresponding projection receptacles formed in the first wing and second wing so that further movement in the second direction is prevented.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view, respectively of an illustrative electronic system 1 in which a cabled connection is made between a connector mounted at the edge 4 of a printed circuit board 2, which here is a motherboard, and a midboard connector 12A mated to a printed circuit board, which here is a daughterboard 6 mounted in a midboard region above printed circuit board 2. In the illustrated example, the midboard connector 12A is used to provide a low loss path for routing electrical signals between one or more components, such as component 8, mounted to printed circuit daughterboard 6 and a location off the printed circuit board. Component 8, for example, may be a processor or other integrated circuit chip. However, any suitable component or components on daughterboard 6 may receive or generate the signals that pass through the midboard connector 12A.

In the illustrated example, the midboard connector 12A couples signals to and from component 8 through an I/O connector 20 mounted in panel 4 of an enclosure. The I/O connector may mate with a transceiver terminating an active optical cable assembly that routes signal to or from another device. Panel 4 is shown to be orthogonal to circuit board 2 and daughterboard 6. Such a configuration may occur in many types of electronic equipment, as high speed signals frequently pass through a panel of an enclosure containing a printed circuit board and must be coupled to high speed components, such as processors or ASICS, that are further from the panel than high speed signals can propagate through the printed circuit board with acceptable attenuation. However, a midboard connector may be used to couple signals between a location in the interior of a printed circuit board and one or more other locations, either internal or external to the enclosure.

In the example of FIG. 1, connector 12A mounted at the edge of daughterboard 6 is configured to support connections to an I/O connector 20. As can be seen, cabled connections, for at least some of the signals passing through I/O connectors in panel 4, connect to other locations with the system. For example, there is a second connector 12B, making connections to daughterboard 6.

Cables 14A and 14B may electrically connect midboard connector assemblies 12A and 12B to locations remote from component 8 or otherwise remote from the location at which midboard connector assemblies 12A or 12B are attached to daughterboard 6. In the illustrated embodiment of FIGS. 1-2, first ends 16 of the cables 14A and 14B are connected to the midboard connector 12A or 12B, Second ends 18 of the cables are connected to an I/O connector 20. Connector 20, however, may have any suitable function and/or configuration, as the present disclosure is not so limited. In some embodiments, higher frequency signals, such as signals above 10 GHz, 25 GHz, 56 GHz or 112 GHz may be connected through cables 14, which may otherwise be susceptible to signal losses at distances greater than or approximately equal to six inches.

Cables 14B may have first ends 16 attached to midboard connector 12B and second ends 18 attached to another location, which may be a connector like connector 20 or other suitable configuration. Cables 14A and 14B may have a length that enables midboard connector 12A to be spaced from second ends 18 at connector 20 by a first distance. In some embodiments, the first distance may be longer than a second distance over which signals at the frequencies passed through cables 14A could propagate along traces within PCB 2 and daughterboard 6 with acceptable losses. In some embodiments, the first distance may be at least 6 inches, in the range of 1 to 20 inches, or any value within the range, such as between 6 and 20 inches. However, the upper limit of the range may depend on the size of PCB 2.

Taking midboard connector 12A as representative, the midboard connector may be mated to printed circuit board, such as daughter card 6, near components, such as component 8, which receive or generate signals that pass through cables 14A. As a specific example, midboard connector 12A may be mounted within six inches of component 8, and in some embodiments, within four inches of component 8 or within two inches of component 8. Midboard connector 12A may be mounted at any suitable location at the midboard, which may be regarded as the interior regions of daughterboard 6, set back equal distances from the edges of daughterboard 6 so as to occupy less than 100% of the area of the daughterboard 6. Such an arrangement may provide a low loss path through cables 14. In the electronic device illustrated in FIG. 1, the distance between connector 12A and processor 8 may be of the order of 1 inch or less.

In some embodiments, midboard connector 12A may be configured for mating to a daughterboard 6 or other PCB in a manner that allows for ease of routing of signals coupled through the connector. For example, an array of signal pads to which terminals of midboard connector 12A are mated may be spaced from the edge of daughterboard 6 or another PCB such that traces may be routed out of that portion of the footprint in all directions, such as towards component 8.

According to the embodiment of FIG. 1, connector 12A includes cables 14A aligned in multiple rows at first ends 16. In the depicted embodiment, cables are arranged in an array at first ends 16 attached to midboard connector 12A. Such a configuration, or another suitable configuration selected for midboard connector 12A, may result in relatively short breakout regions that maintain signal integrity in connecting to an adjacent component in comparison to routing patterns that might be required were those same signals routed out of an array with more rows and fewer columns.

As shown in FIG. 1 the connector 12A may fit within a space that might otherwise be unusable within electronic device 1. In this example, a heatsink 10 is attached to the top of processor or component 8. Heatsink 10 may extend beyond the periphery of processor 8. As heatsink 10 is mounted above daughterboard 6, there is a space between portions of heatsink 10 and daughterboard 6. However, this space has a height H, which may be relatively small, such as 5 mm or less, and a conventional connector may be unable to fit within this space or may not have sufficient clearance for mating. However, at least a portion of the connector 12A and other connectors of exemplary embodiments described herein may fit within this space adjacent to processor 8. For example, a thickness of a connector housing may be between 3.5 mm and 4.5 mm. Such a configuration uses less space on printed circuit daughterboard 6 than if a connector were mounted to printed circuit daughterboard 6 outside the perimeter of heatsink 10. Such a configuration enables more electronic components to be mounted to printed circuit to which the midboard connector is connected, increasing the functionality of electronic device 1. Alternatively, the printed circuit board, such as daughterboard 6, may be made smaller, thereby reducing its cost. Moreover, the integrity with which signals pass from connector 12A to processor 8 may be increased relative to an electronic device in which a conventional connector is used to terminate cables 14A, because the length of the signal path through printed circuit daughterboard 6 is reduced.

While the embodiment of FIG. 1 depicts a connector connecting to a daughter card at a midboard location, it should be noted that connector assemblies of exemplary embodiments described herein may be used to make connections to other substrates and/or other locations within an electronic device.

As discussed herein, midboard connector assemblies may be used to make connections to processors or other electronic components. Those components may be mounted to a printed circuit board or other substrate to which the midboard connector might be attached. Those components may be implemented as integrated circuits, with for example one or more processors in an integrated circuit package, including commercially available integrated circuits known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores in one package such that one or a subset of those cores may constitute a processor. Though, a processor may be implemented using circuitry in any suitable format.

In the illustrated embodiment, the processor is illustrated as a packaged component separately attached to daughtercard 6, such as through a surface mount soldering operation. In such a scenario, daughtercard 6 serves as a substrate to which midboard connector 12A is mated. In some embodiments, the connector may be mated to other substrates. For example semiconductor devices, such as processors, are frequently made on a substrate, such as semiconductor wafer. Alternatively, one or more semiconductor chips may be attached, such as in a flip chip bonding process, to a wiring board, which may be a multi-layer ceramic, resin or composite structure. The wiring board may serve as a substrate. The substrate for manufacture of the semiconductor device may be the same substrate to which the midboard connector is mated.

Electronic systems as illustrated in FIG. 1 may be constructed with connectors such as 12A and 12B implemented with a board connector, such as might be mounted to daughtercard 6, and a cable connector that mates with the board connector.

Figure 2:
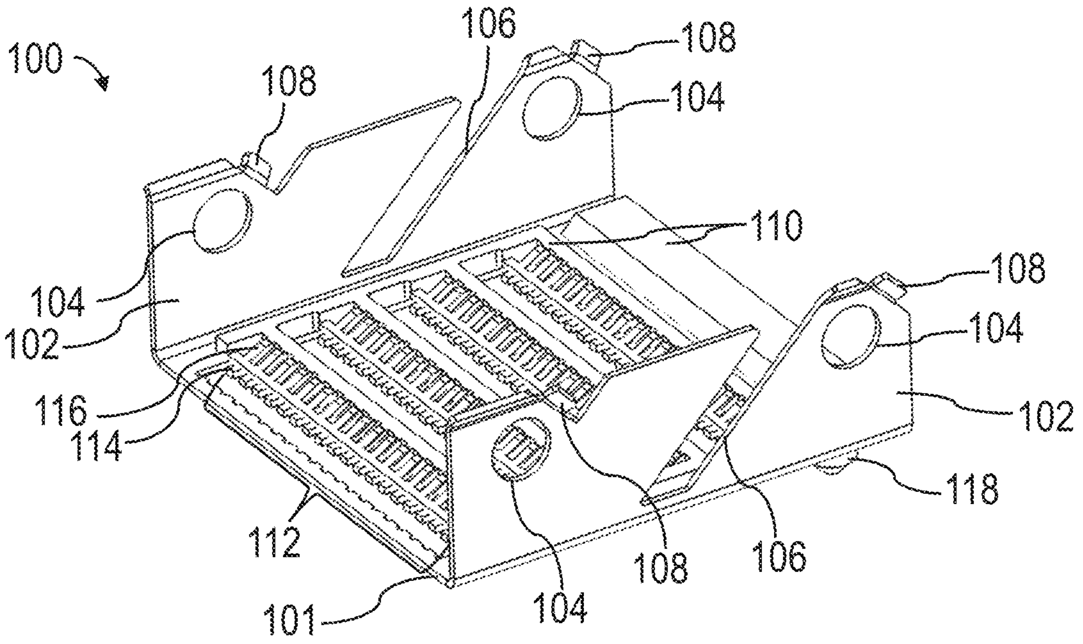
FIG. 2 is a perspective view of an exemplary embodiment of a board connector.

FIG. 2 is a perspective view of an exemplary embodiment of a board connector 100. As shown in FIG. 2, the board connector is formed primarily from a unitary piece of material (e.g. metal), and may be formed from a process including stamping and overmolding. The board connector includes a terminal assembly including a base 101 and two wings 102. The base is disposed in a first plane, while the two wings 102 extend from the base. In the illustrated embodiment, the wings extend orthogonally from the base. According to the embodiment of FIG. 2, the board connector includes features that engage and position a cable connector. In this example, those features include a plurality of projection receptacles 104, with two projection receptacles disposed on each wing 102 near the corners regions of the wings. Each wing 102 also includes a guide channel 106 which is inclined relative to the base 101 and has an open end opposite the base. The guide channel may be angled relative to the base. The angle may be between 15 and 60 degrees, or between as 30 and 55 degrees in some embodiments. FIG. 2, for example, illustrates the guide channel angled at approximately 45 degrees relative to the base.

As shown in FIG. 2, the wings also each include two lead-in tabs 108 associated with the projection receptacles. The function of the lead-in tabs and projection receptacles 104 will be discussed further with reference to FIG. 4. According to some embodiments, as shown in FIG. 2, the board connector may include an alignment projection 118 configured to assist in aligning the board connector terminals with contact pads on a PCB or other substrate. The alignment projection 118 may be received in a corresponding hole in the PCB or other substrate to orient and align the board connector. Projection 118 may be used, for example, to position the board connector on a PCB prior to reflow soldering the terminals of the board connector to pads of the PCB.

According to the embodiment of FIG. 2, the board connector 100 includes a plurality of terminals 112 associated with the base 101. The plurality of terminals may be integrally formed with the base during a manufacturing process where the terminals are stamped from sheet metal. In the example of FIG. 2, the terminals are formed in four rows. Each row may align with a terminal subassembly of a mating cable connector.

Each terminal includes a first portion 114 and a second portion 116. The first portion is disposed in the plane of the base 101, and may be configured as a solder tail for soldering to a contact pad on an associated substrate (e.g., PCB). For example, the solder tails may each be configured to be soldered to a PCB with a solder reflow process. The second portion 116 is disposed at an angle relative to the plane of the base 101. The second portion extends upwards away from the base to form a contact tip for corresponding terminals of a cable connector. The second portions also function as cantilevered beams configured to undergo elastic bending and provide a biasing spring force urging a corresponding cable connector away from the board connector when a cable connector is mated to the board connector 100. In some embodiments, the second portion may be angled relative to the plane of the lower face of the base at an angle between 15 and 45 degrees, for example. According to the embodiment of FIG. 2, the second portion is angled between 20 and 30 degrees.

According to the embodiment of FIG. 2, the board connector 100 includes a dielectric 110 overmolded on the plurality of terminals 112 and the base 101. The dielectric is configured to physically support each of the terminals relative to the base 101. Accordingly, the integrally formed plurality of terminals may be physically and electrically severed from one another. In some embodiments, tie bars between the terminals may be removed. Once the plurality of terminals are electrically severed, the dielectric 110 may provide the sole physical support for the terminals, and may maintain their position relative to the base 101. Accordingly, in some embodiments of a manufacturing process, a terminal assembly may be stamped, a dielectric may be overmolded over the plurality of terminals and a portion of the base, and at least a portion of the terminals may be electrically severed from one another (e.g., by removing tie bars).

According to the embodiment of FIG. 2, each terminal assembly includes 76 terminals. Of course, in other embodiments, any number of terminals may be employed, as the present disclosure is not so limited.

Figure 3:
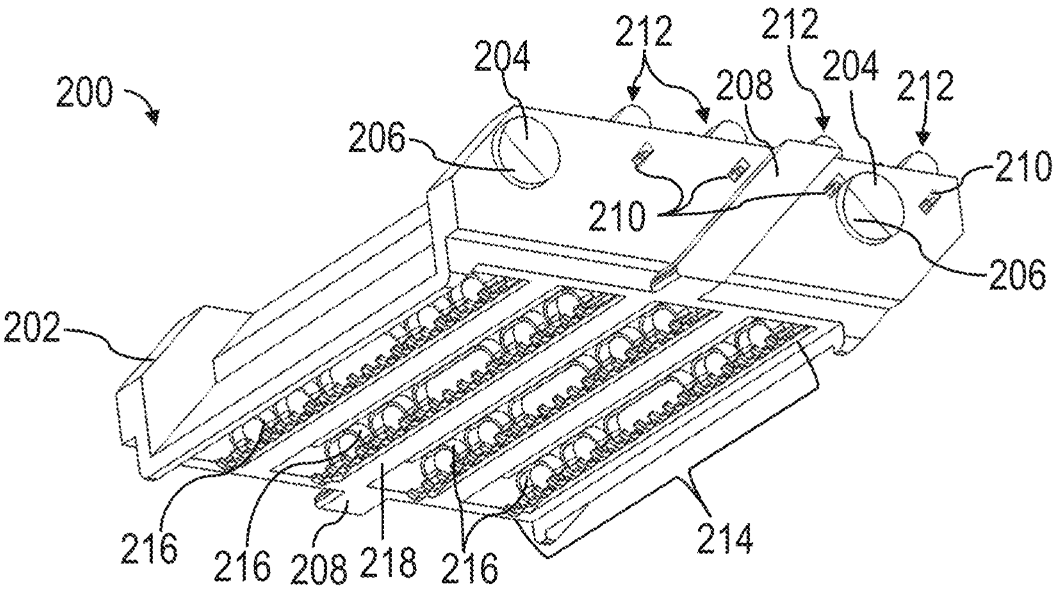
FIG. 3 is a perspective view of an exemplary embodiment of a cable connector.

FIG. 3 is a perspective view of an exemplary embodiment of a cable connector 200. As shown in FIG. 3, the cable connector includes a connector housing 202. The connector housing includes a plurality of projections 204. In particular, the connector housing has two projections 204 shown in FIG. 3, and two corresponding projections on an opposing side of the connector housing. The projections 204 are configured to engage projection receptacles formed in a board connector. In particular, the projections are configured to engage the projection receptacles to resist movement of the cable connector away from a board connector. Each of the projections 204 includes a lead-in 206 which is configured to allow the projections to move past corresponding projection receptacles when the cable connector is moved toward the board connector, as will be discussed further with reference to FIG. 4.

As shown in FIG. 3, the connector housing also includes guides 208 disposed on opposite sides of the connector housing. The guides are angled relative to a bottom face 218 of the connector housing which may sit parallel to a PCB or other substrate when the cable connector is engaged with a board connector. According to the embodiment of FIG. 3, the guides 208 are angled at an angle relative to the bottom face. The guides may be angled at an angle that matches that of guide channel 106. The angle, for example, may be between 15 and 60 degrees, such as at an angle between 30 and 50 degrees. The guides 208 may be received in corresponding guide channels of a board connector to restrict the relative movement of the cable connector to a single axis (i.e., eliminating or reducing rotational axes). The connector housing 202 may be formed of a dielectric material (e.g., plastic), but the present disclosure is not so limited in this regard, and any appropriate material may be employed.

According to the embodiment of FIG. 3, the connector housing 202 is configured to receive a plurality of terminal assemblies 212. The terminal assemblies are received in slots arranged in rows, so that a plurality of terminals 214 extend past the bottom face 218 at an angle relative to the bottom face. According to the embodiment, of FIG. 3, the terminal assemblies are angled at an angle relative to the bottom face. The terminal assemblies may be angled at an angle that matches that of guides 208. The angle, for example, may be between 15 and 60 degrees, such as at an angle between 30 and 50 degrees. The terminal assemblies 212 are configured to be retained in the connector housing with retaining tabs that engage corresponding tab receptacles 210 formed in the connector housing. As shown in FIG. 3 and as will be discussed further with reference to FIGS. 5-6A, each terminal assembly 212 includes a ground conductor 216 configured to short a ground portion of the terminals to reduce resonance modes of the ground portion of the plurality of terminals. According to the embodiment of FIG. 3, each terminal assembly includes 19 terminals, and the connector housing accommodates four terminal assemblies for a total of 76 terminals. Of course, in other embodiments, any number of terminals and terminal assemblies may be employed, as the present disclosure is not so limited.

Figure 4:
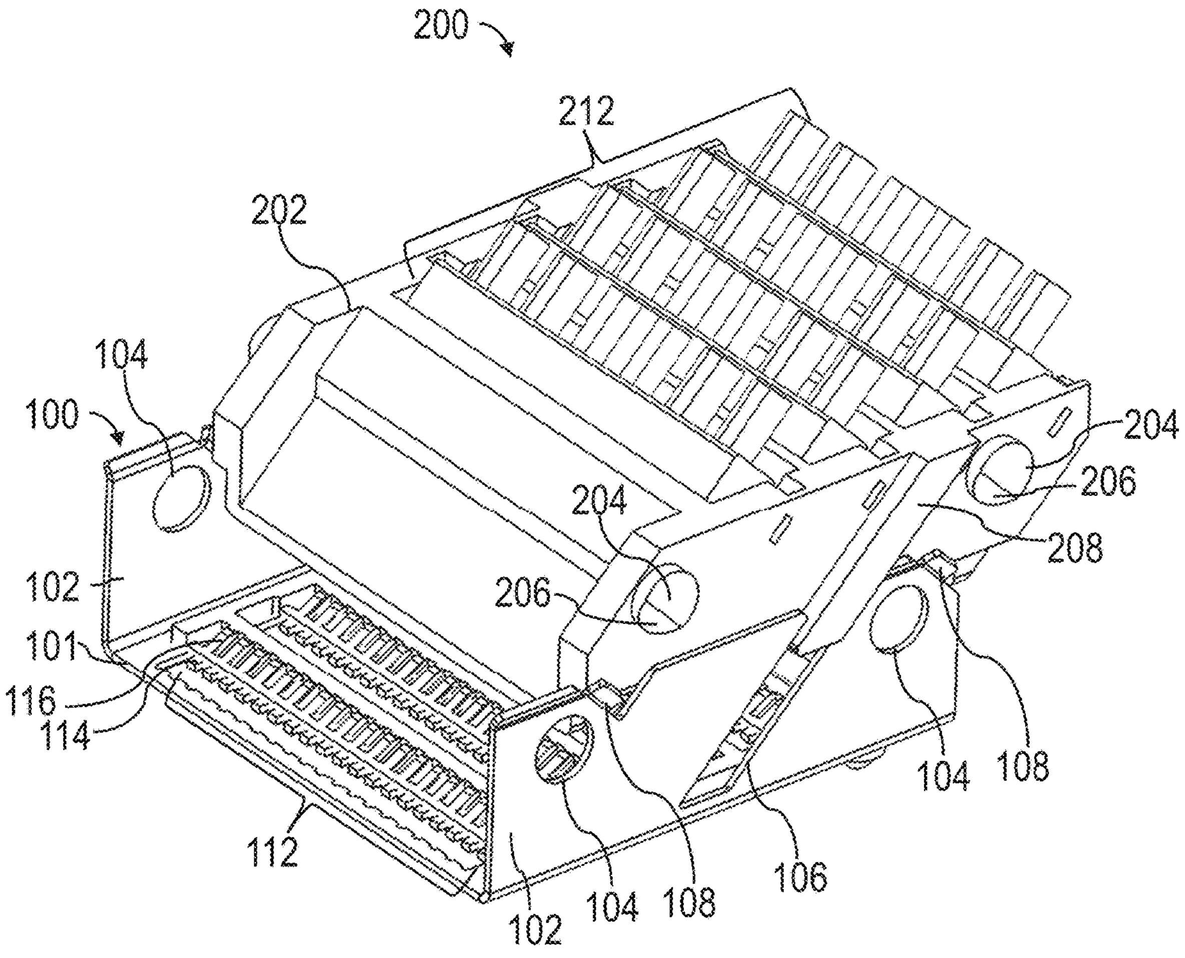
FIG. 4 is a perspective view of the board connector of FIG. 2 receiving the cable connector of FIG. 3.

FIG. 4 is a perspective view of the board connector 100 of FIG. 2 receiving the cable connector 200 of FIG. 3 during a mating sequence. As shown in FIG. 4, the guides 208 of the cable connector housing 202 are received in the guide channels 106 of the first and second wings 102. Accordingly, the movement of the cable connector 200 is limited to movement along a single axis, where movement in the first direction moves the cable connector close to the board connector and movement in a second direction moves the cable connector further away from the board connector. The axis of movement of the cable connector is parallel to the guides 208 and the guide channels 106, and in the embodiment shown in FIG. 4 is between 30 and 45 degrees relative to the base 101 of the board connector.

As shown in FIG. 4, the lead-ins 206 of each of the projections 204 of the cable connector 200 are aligned with the lead-in tabs 108 of the board connector 100. The lead-ins 206 and lead-in tabs 108 have complementarily angled surfaces so that engagement between the lead-ins and lead-in tabs does not inhibit movement of the cable connector. In particular, when the lead-ins 206 engage the lead-in tabs 108, the first and second wings 102 may be elastically deformed outward away from the cable connector, so that the wings 102 accommodate the width of the cable connector.

As the cable connector continues to move closer to the board connector, the lead-ins 206 may also engage the projection receptacles 104 to deform the wings 102 outward and to avoid capturing the projections 204 in the projection receptacles when the cable connector is moved in the first direction. Accordingly, the cable connector 200 may be freely moved in the first direction until the plurality of cable terminals contact the plurality of board terminal 112.

Upon insertion of cable connector 200 into board connector 100, the terminals of the cable connector engage the second portions 116 of the board connector terminals. As the second portions 116 are disposed at an angle relative to the base 101, the second portions may elastically deform and generate biasing force urging the cable connector in the second direction away from the board connector. Accordingly reducing or removing the insertion force from the cable connector allows the cable connector to move in the second direction under urging from the second portions until the projections 204 are captured in the projection receptacles, thereby inhibiting further movement in the second direction. This process accomplishes a terminal wipe for effective electrical conduction, and also provides for a known stub length of the terminals with a low tolerance.

Figure 5:
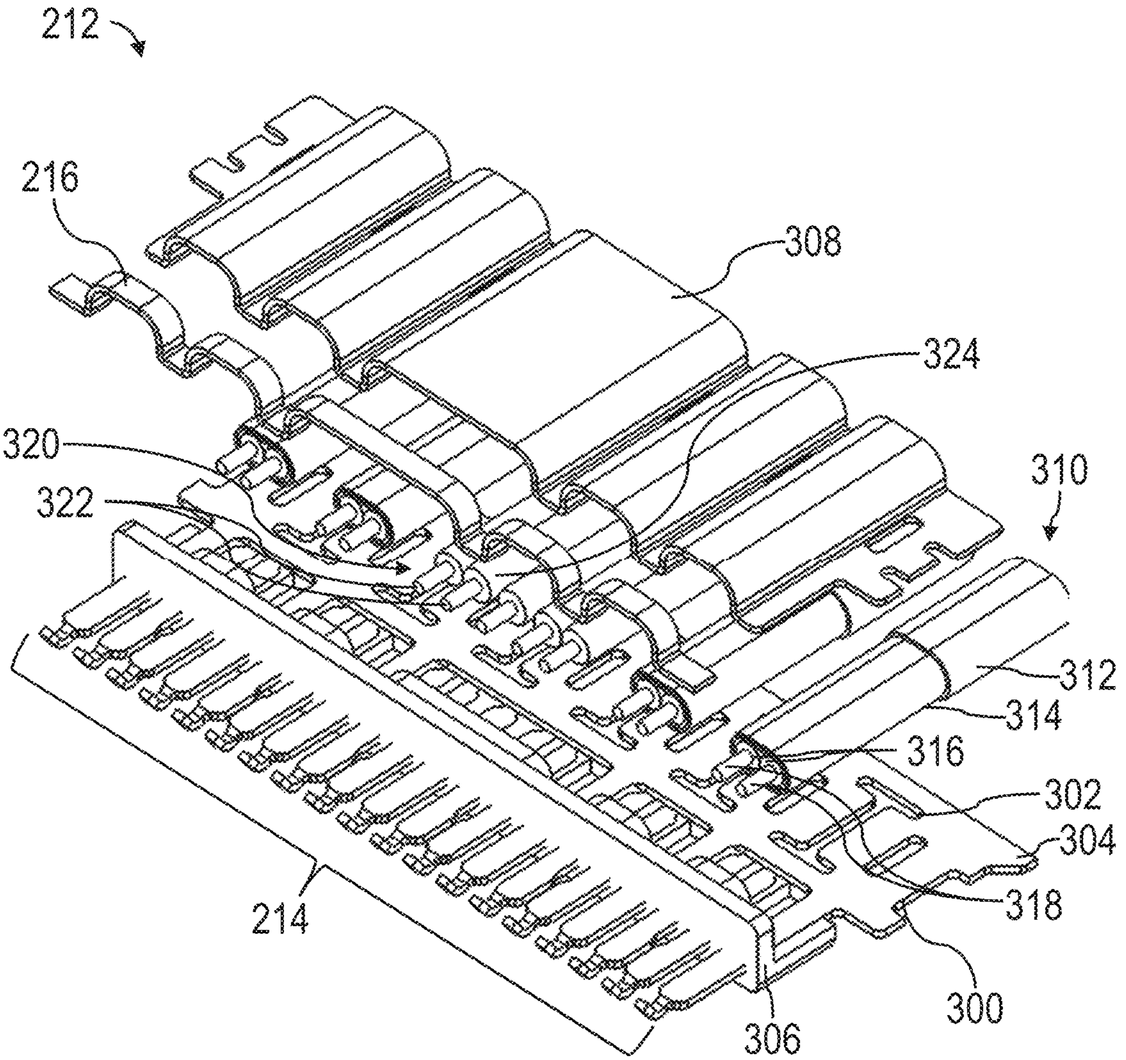
FIG. 5 is an exploded perspective view of an exemplary embodiment of a cable connector, without an overmold.

FIG. 5 is an exploded perspective view of an exemplary embodiment of a cable connector terminal assembly 212. As shown in FIG. 5, the terminal assembly includes a plurality of terminals 214 extending from a cable clamp plate 300. The plurality of terminals and cable clamp plate may be stamped from the same piece of metal, such that the plurality of terminals and cable clamp plate were at one point integral. As shown in FIG. 5, the terminal assembly also includes a dielectric 306 overmolded over the plurality of terminals 214 and a portion of the cable clamp plate. The dielectric may be plastic material and may physically support the plurality of terminals. Accordingly, at least a portion of the plurality of terminals may be physically separated from the cable clamp plate (e.g., tie bars are removed) to electrically isolate the terminals. The dielectric may maintain the relative position of the terminals 214. In the embodiment of FIG. 5, the cable clamp plate 300 also includes retaining tabs 304 configured to be received in corresponding tab receptacles of a cable connector housing. Such an arrangement allows the terminal assembly to be reliably and accurately secured in a cable connector housing.

The cable clamp plate is configured to secure a plurality of cables 310 to the terminal assembly. The cables 310 may be configured as drainless twinax cables. The drainless twinax cable includes two cable conductors 318, each of which may be electrically and physically coupled to one or more of the terminals 214. Each of the cable conductors are surrounded by dielectric insulation 316 which electrically isolates the cable conductors from one another. A shield 314 which may be connected to ground surrounds the cable conductors and dielectric insulation 316. The shield may be formed of a metal foil and may fully surround the circumference of the cable conductors. The shield may be coupled to one or more ground contact tips through a compliant conductive member. Surrounding the shield is an insulating jacket 312. Of course, while a drainless twinax cable is shown in FIG. 5, other cable configurations may be employed, including those having more or less than 2 cable conductors (e.g., 1 cable conductor), one or more drain wires, and/or shields in other configurations, as the present disclosure is not so limited. For example, as shown in FIG. 5, the cable clamp plate also accommodates single conductor cables 320, which each include single conductors 322 surrounded by a single layer of dielectric insulation 324.

The conductors of the cables may be attached, such as by soldering or welding, to tails of the terminals in the terminal assembly. The shields of the cables may be electrically connected to the ground structures of the terminal assembly via clamping.

According to the embodiment of FIG. 5, the cable clamp plate 300 includes multiple strain relief portions 302. The strain relief portions of FIG. 5 are defined by an I-shaped slot or opening formed in the cable clamp plate that allows the cable clamp plate to deform under clamping pressure securing the cables to the cable clamp plate. Such an arrangement may reduce or eliminate the likelihood of the cable conductors 318 being crushed or otherwise altered by clamping force. In the embodiment of FIG. 5, a metal shield plate 308 is used to clamp the cables 310 to the cable clamp plate. The metal shield plate may be secured around the cables by welding (e.g., laser welding), overmolding, or another appropriate process, once an appropriate clamping force (e.g., 100 lbs) is applied to the metal plate.

As shown in FIG. 5, the terminal assembly includes a ground conductor 216 configured to electrically interconnect the terminals 214 that serve as ground terminals. The ground conductor may be laser welded or soldered to the ground portion of the plurality of terminals 214 near the end of the terminals. That is the ground conductor may be no more than 1.97 mm from an end of the terminals. Such an arrangement may reduce the quarter wavelength of standing resonance modes, thereby allowing the connector to support higher frequencies without resonance mode interference.

Figure 6A:
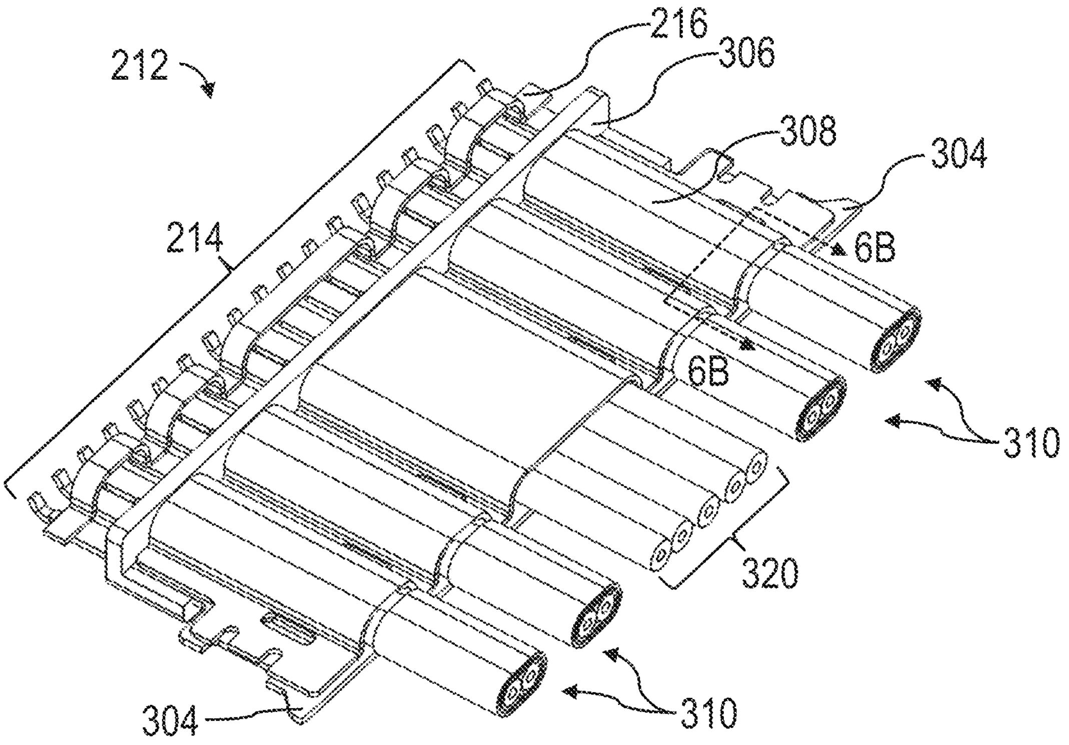
FIG. 6A is an assembled perspective view of the cable connector of FIG. 5.

FIG. 6A is an assembled perspective view of the cable connector terminal assembly 212 of FIG. 5. As shown in FIG. 6A, the metal shield plate 308 has been secured around the twinax cables 310 and the single conductor cables 320. The metal plate may be welded or otherwise secured to the cable clamp plate 300 to provide suitable clamping force to secure the cables 310, 320. The ground conductor 216 is also electrically connected to some of the plurality of terminals 214, thereby shorting the ground terminals together. According to the embodiment of FIG. 6A, the terminal assembly is disposed primarily in a plane, and multiple terminal assemblies according to FIG. 6A may be secured in rows in a cable connector housing with retaining tabs 304.

Figure 6B:
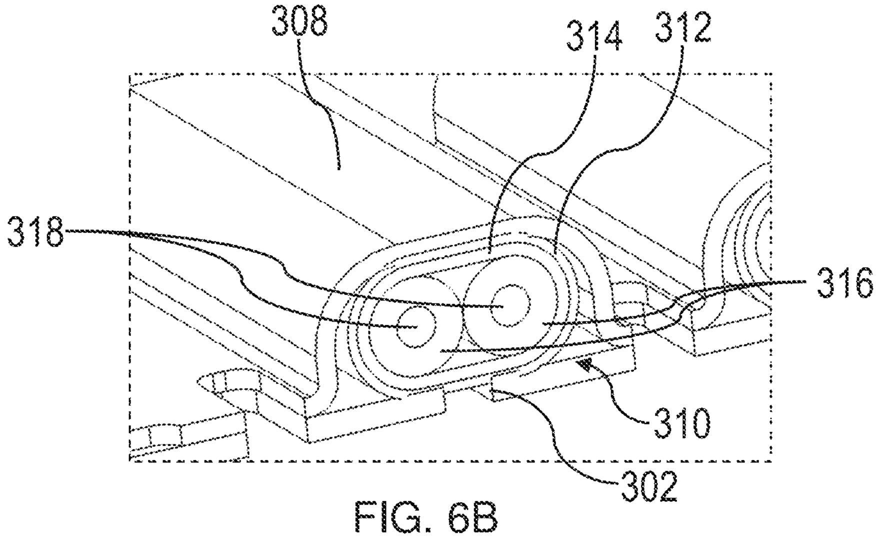
FIG. 6B is a cross section of the cable connector of FIG. 6A taken along line 6B-6B.

FIG. 6B is a cross section of the cable connector terminal assembly 212 of FIG. 6A taken along line 6B-6B, showing the arrangement of one of the twinax cables 310 and the metal shield 308 clamping the cable. As shown in FIG. 6B, the cable includes two signal conductors 318 surrounded by dielectric insulation 316. Surrounding both of the dielectric insulation layers is a shield 314 configured to reduce the effects of electromagnetic interference. The shield 314 may be electrically connected to the ground terminals. Surrounding the shield 314 is a dielectric insulating jacket 312 which protects the cable 310. The metal shield plate 308 applies pressure to the insulating jacket 312 to secure the cable to the terminal assembly. The signal conductors 318 may be welded, soldered, or otherwise electrically connected to corresponding terminals.

Figure 7:
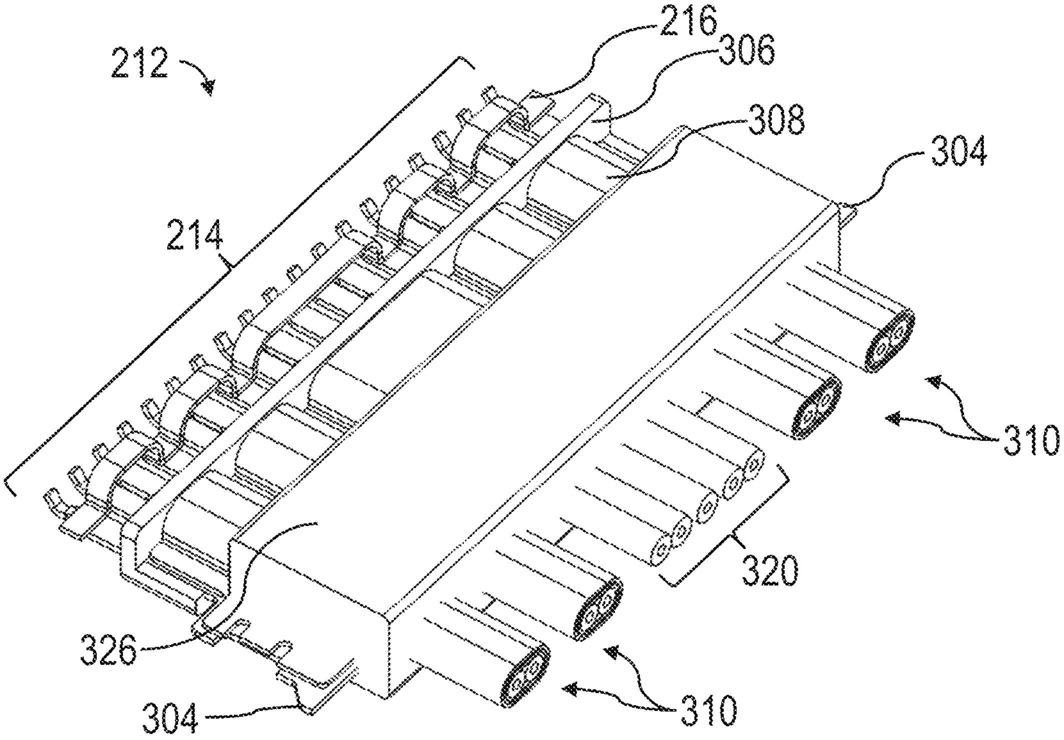
FIG. 7 is a perspective view of the cable connector with an overmold in place.

FIG. 7 is a perspective view of the cable connector terminal assembly 212, showing one embodiment of an attached metal shield plate 308 securing cables 310, 320. As shown in FIG. 7, a portion of the metal shield plate 308 and the cable clamp plate are overmolded with a dielectric material 326. The dielectric material may partially surround the cables, holding the cables so as to reduce strain on the connections between the cables and the terminal subassembly. Overmolding may reduce the clamping force required to produce a robust terminal assembly. The dielectric may be a plastic, and may secure the metal shield plate with appropriate clamping force for securing the cables 310, 320.

Figure 8A:
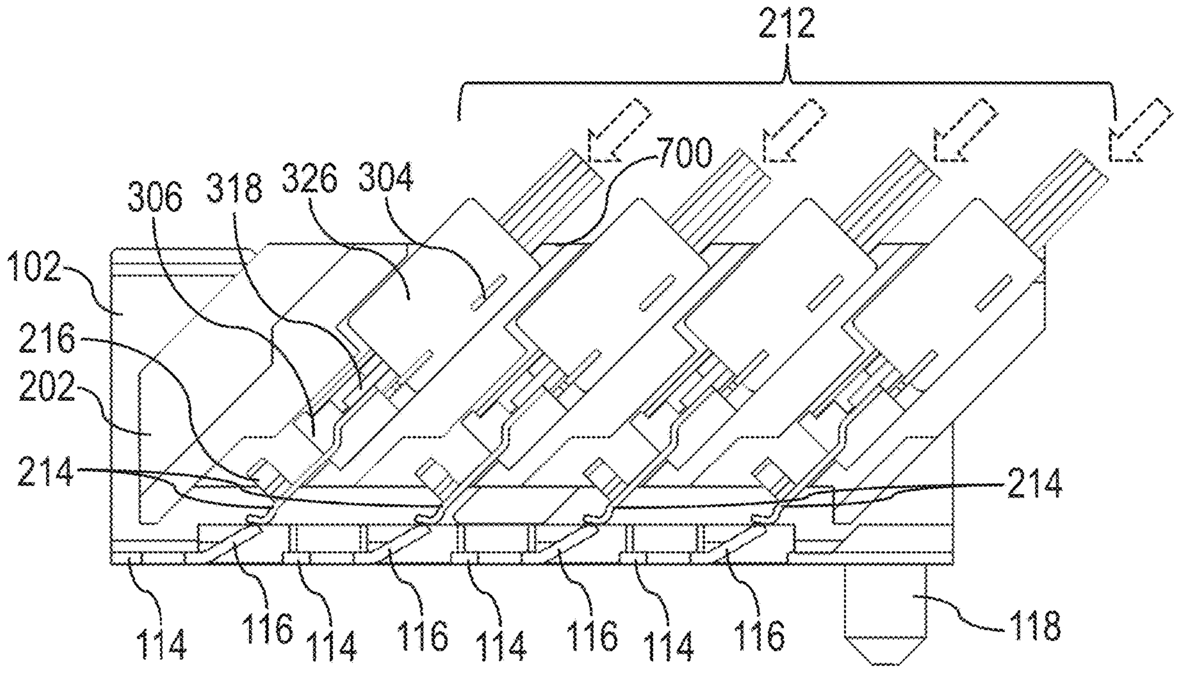
FIG. 8A is a cross-sectional view of an exemplary embodiment of a cable connector mating with a board connector in a first position.
Figure 8B:
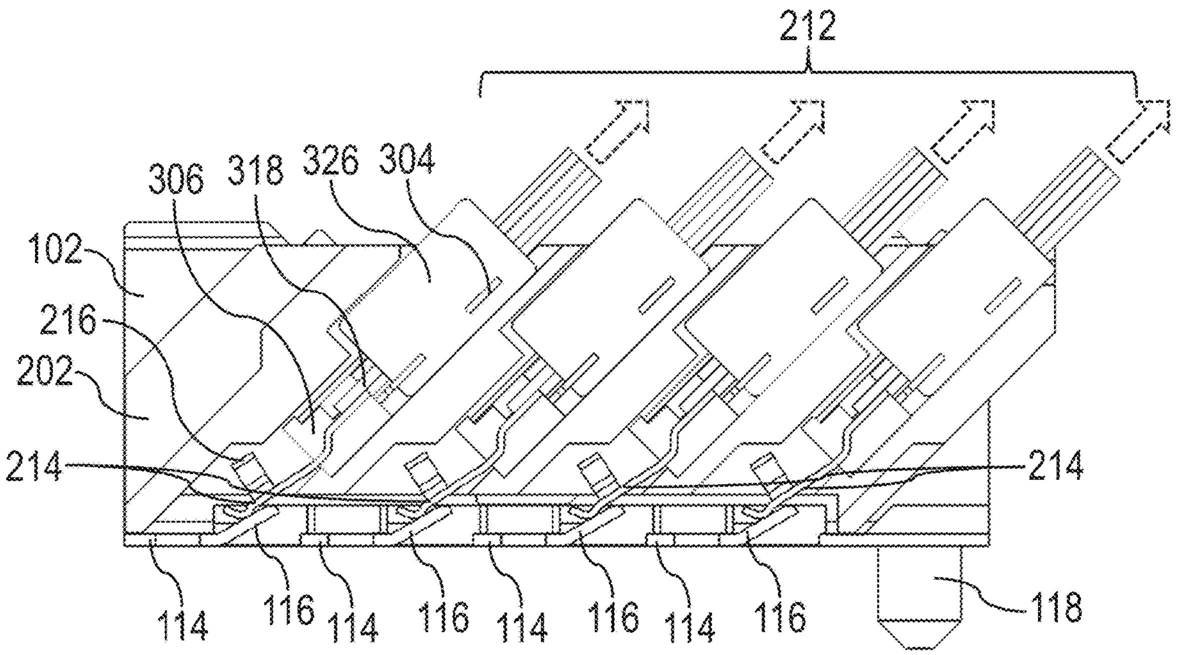
FIG. 8B is a cross-sectional view of the cable connector and board connector in a second position.

FIGS. 8A-8B are cross-sectional views of an exemplary embodiment of a cable connector mating with a board connector in a first position and second position, respectively. FIGS. 8A-8B show a process for wiping terminals of a cable connector and board connector and allowing the terminals to bias the cable connector away from the board connector. As shown in FIG. 8A, the cable connector includes multiple terminal assemblies 212 disposed in rows 700 formed in a cable connector housing 202. The terminal assemblies are secured by retaining tabs 304 received in corresponding receptacles formed in the cable connector housing 202. The terminal assemblies each include a plurality of cable terminals 214. A signal portion of the cable terminals are electrically connected with a cable conductor 318 of a cable. A ground portion of the cable terminals are shorted together with a ground conductor 216 and may also be electrically connected to one or more cable shields. The terminal assemblies 212 are all angled relative to as base of the board connector and/or underlying substrate by an angle between 30 and 45 degrees. As shown in FIG. 8A, the board connector includes a plurality of board terminals, each having a first portion 114 functioning as a solder tail and a second portion 116 angled relative to the base of the board connector. The angled second portions 116 are angled relative to the base of the board connector by an angle between 20 and 30 degrees, less than the angle of the terminal assemblies 212.

As shown in FIG. 8A, the cable connector may be moved toward the board connector in a first direction as shown by the dashed arrows. The first direction may corresponding to a direction in which a guide of the cable connector extends. In the embodiment of FIG. 8A, the first direction is also parallel to a plane of the terminal assemblies 212. As the cable connector is moved in the first direction, the cable terminals 214 engage the second portions 116 with a curved tip. As force is applied to the cable connector to move the cable connector in the first direction, the cable terminals 214 and second portions may be elastically deformed. Accordingly, as shown in FIG. 8B, the deflection of the cable terminals 214 and/or second portions 116 generates a biasing spring force urging the cable connector in a second direction opposite the first direction. As a result and as shown by the dashed arrows of FIG. 8B, reducing or eliminating the insertion force applied to the cable connector to move the cable connector in the first direction causes the cable connector to move in the second direction. The movement of the cable connector in the first and second directions causes the cable terminals 214 to wipe the second portions 116, thereby ensuring a good electrical connection between the board terminals and cable terminals.

Figure 9:
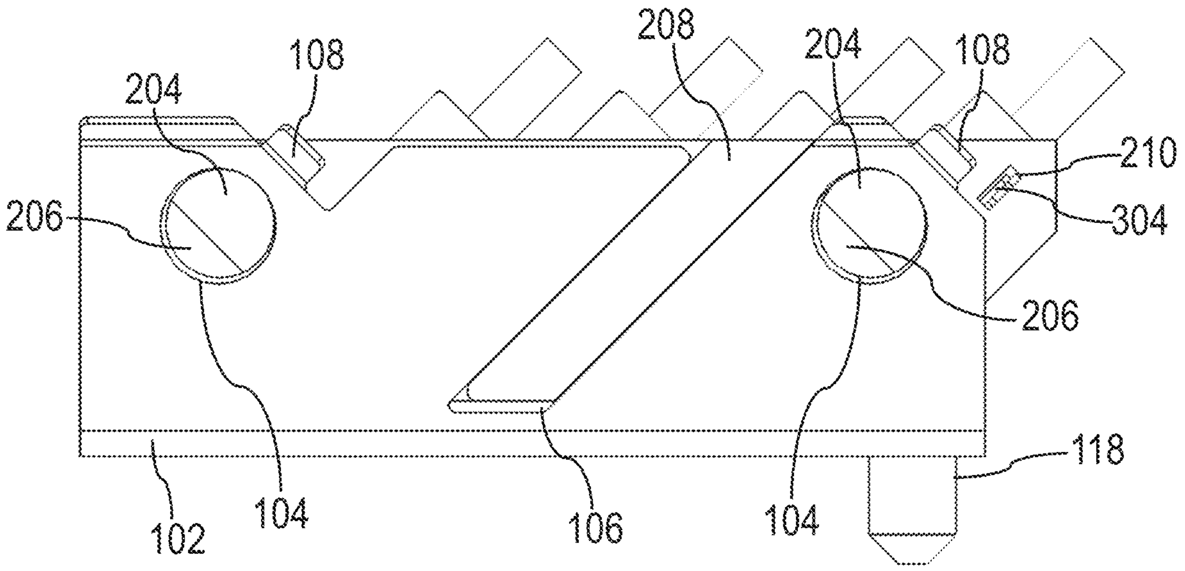
FIG. 9 is a side view of an exemplary embodiment of a mated board connector and cable connector.

FIG. 9 is a side view of an exemplary embodiment of a mated board connector and cable connector. As shown in FIG. 9, the cable connector is received between wings 102 of the board connector. Guides 208 of the cable connector are disposed in corresponding guide channels 106 disposed in the wings 102. Likewise, projections 204 of the cable connector are disposed in projection receptacles 104 formed in the wings 102 of the board connector. The projections inhibit movement of the cable connector away from the board connector. In some embodiments, the cable connector may be released by applying force the lead-in tabs 108 to deflect the wings 102 outward relative to the cable connector until the projections 204 can clear the projection receptacles 104. Of course, other release arrangements may be employed, as the present disclosure is not so limited.

Figure 10:
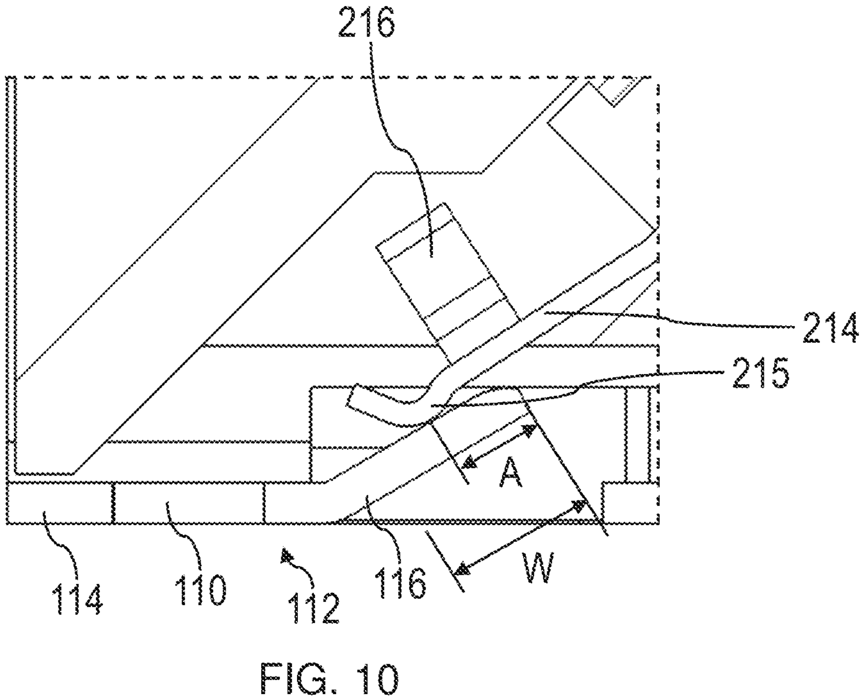
FIG. 10 is a side view of an exemplary embodiment of a terminal of a board connector mating with a terminal of a cable connector.

FIG. 10 is a side view of an exemplary embodiment of a terminal 112 of a board connector mating with a terminal 214 of a cable connector. As shown in FIG. 10, the board terminal 112 includes a first portion 114 and a second portion 116. The first portion may be disposed in a plane parallel to an underlying substrate (e.g., PCB), and may be configured to be soldered to a corresponding contact pad. The second portion 116 is angled relative to the first portion and is configured to physically and electrically engage the cable terminal 214. As shown in FIG. 10, the cable terminal includes a curved tip 215 to facilitate engagement and wipe of the terminals. As discussed previously, the second portion 116 and cable terminal 214 are both arranged as cantilevered beams configured to generate a biasing force when engaged to bias the cable connector away from the board connector.

This arrangement allows projections of the cable connector to be received in stamped projection receptacles of the board connector with a very low or tight tolerance relative to the board terminals. Accordingly, this biasing force yields an engagement between the second portion 116 and the curve tip 215 with a stub length A that has a correspondingly tight tolerance. In particular, the length A may be known to within 0.25 mm. Accordingly, the cable terminals 214 and board terminals 112 may be manufactured to reduce the stub length A to approximately 0.25 mm. Such an arrangement ensures proper mating between the terminals, even if the relative position deviates by the maximum tolerance. Nonetheless, the resulting stub is short, which limits the effects of stub resonance and signal reflections that could otherwise limit bandwidth of the board connector.

Further, as part of the mating sequence the terminals of the cable connector may wipe along the terminals of the board connector by a wipe length W that exceeds the stub length A. In this example, the wipe length W equals the stub length A plus the distance that the cable connector is pushed back by the spring force generated when the terminals are deflected.

According to exemplary embodiments described herein, terminals of a board connector and/or cable connector may have an average center to center spacing of less than 1.5 mm. Of course, other spacing arrangements are contemplated, including center to center spacing between 1 mm and 3 mm, as the present disclosure is not so limited.

According to exemplary embodiments described herein, up to 100 N of force may be used to eject a cable connector from a board connector. In other embodiments, a different ejection force may be applied, such as up to 75 N or up to 125 N, for example. In some embodiments, an ejection force greater than or equal to 25 N and less than or equal to 75 N may be employed.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. For example, connector assemblies of exemplary embodiments described herein may be employed in silicon to silicon application for data transmission rates greater than or equal to 28 Gbps and 56 Gbps. Additionally, connector assemblies may be employed where signal losses from trace signal transmissions are too great, such as in cases where signal frequencies exceed 10 GHz, 25 GHz, 56 GHz or 112 GHz.

As another example, a midboard connection system was described in which a cable connector is biased into a position set by retention features on the cable connector and a mating receptacle connector. Techniques as described herein may be used in connectors with other configurations, such as mezzanine connectors or vertical configuration.

As another example, mating cable and board connectors that are biased apart as a result of spring force generated in the terminals of each connector when the connectors are pushed together for mating. Alternatively or additionally, spring members may be incorporated into either or both of the mating connectors to generate or increase the amount of spring force biasing the connectors apart.

As yet another example, a board connector was described as connecting to a PCB through surface mount soldering. A board connector may alternatively or additionally have terminals with contact tails shaped for pressure mounting to a PCB, such as by bending the tails to have tips extending below a base of the connector, such that the contact tails are deflected as the base is pressed against a surface of a PCB.

In some embodiments, a method of constructing a connector includes stamping a terminal assembly, where the terminal assembly includes a cable clamp plate, and a plurality of terminals extending from the cable clamp plate. The method further includes overmolding portions of the plurality of terminals with a dielectric material, and, for a portion of the plurality of terminals, severing a connection between the terminal and each of the other of the plurality of electrically connected terminals. In some embodiments, the plurality of terminals are electrically connected through the cable clamp plate, and severing the connection, for each of the first portion of the plurality of terminals, includes physically severing terminals of the first portion from the cable clamp plate. In some embodiments, the method further includes securing a plurality of cables to the cable clamp plate. In some embodiments, securing the plurality of cables includes compressing the plurality of cables against the cable clamp plate with a metal shield. In some embodiments, securing the plurality of cables further includes welding the metal shield to the cable clamp plate. In some embodiments, securing the plurality of cables further includes overmolding the metal shield, cable clamp plate and a portion of the plurality of cables. In some embodiments, the method further includes deforming one or more strain relief portions of the cable clamp plate. In some embodiments, the strain relief includes an I-shaped opening in the cable clamp plate. In some embodiments, the plurality of terminals include beams extending from the dielectric material, and the method further includes welding an elongated conductor to the beams of a second portion of the plurality of terminals. In some embodiments, the first portion of the plurality of terminals is disjointed from the second portion of the plurality of terminals. In some embodiments, the method further includes inserting the terminal assembly, overmolded dielectric, and secured cables into a connector housing. In some embodiments, the connector housing is formed of a dielectric material. In some embodiments, connector housing has a bottom face disposed in a first plane, and where the terminal assembly is inclined relative to the first plane. In some embodiments, the terminal assembly is inclined at an angle between approximately 30 and 45 degrees relative to the first plane. In some embodiments, the method further includes securing the terminal assembly in the connector housing by inserting a tab of the cable clamp plate into a tab receptacle of the connector housing. In some embodiments, the terminal assembly includes 19 terminals. In some embodiments, the connector housing includes at least two guides disposed on opposite sides of the first connector housing. In some embodiments, the at least two guides extend in a direction parallel to the plurality of first terminals. In some embodiments, the connector housing includes at least two projections configured to engage a connector receptacle. In some embodiments, each of the at least two projections includes a lead-in configured to engage a connector receptacle first when the connector housing is moved into the connector receptacle. In some embodiments, the method further includes laser welding a ground conductor to a ground portion of the plurality of terminals.

In some embodiments, a method of making an electrical connection includes moving a first connector in a first direction relative to a second connector, bringing the plurality of first connector terminals into contact with a plurality of terminals of the second connector, pressing the plurality of first connector terminals against the plurality of second connector terminals so as to bias the first connector in a second direction opposite the first direction, allowing the first connector to move in the second direction, and restraining motion in the second direction of the first connector relative to the second connector by engaging features of the first connector to features of the second connector. In some embodiments, restraining motion in the second direction includes engaging a projection receptacle of the second connector with at least one projection of the first connector when the first connector moves in the third direction. In some embodiments, the second connector is coupled to a circuit board defining a first plane, and the first direction and second direction are inclined relative to the first plane. In some embodiments, the first direction is inclined at an angle between approximately 10 and 20 degrees relative to the first plane. In some embodiments, the plurality of terminals of the second connector are inclined at an angle between approximately 30 and 45 degrees relative to the first plane. In some embodiments, bringing the plurality of terminals of the first connector into contact with a plurality of terminals of the second connector includes wiping the first connector terminals and second connector terminals as the first connector moves in the first direction. In some embodiments, biasing the first connector in the second direction includes elastically bending the plurality of terminals of the first connector. In some embodiments, biasing the first connector in the second direction includes elastically bending the plurality of terminals of the second connector. In some embodiments, the first connector in the third direction includes elastically bending both the plurality of terminals of the first connector and the plurality of terminals of the second connector. In some embodiments, moving the first connector in a first direction relative to a second connector includes moving the first connector into the second connector. In some embodiments, engaging features of the first connector to features of the second connector includes engaging a projection of the first connector in a projection receptacle of the second connector and moving the first connector into the second connector includes elastically deforming a first wing and a second wing with the at least one projection. In some embodiments, the at least one projection includes a lead-in configured to engage the first wing and second wing when the first connector is moved into the second connector. In some embodiments, the lead-in of the at least one projection engages at least one tab of the first wing and/or second wing when the first connector is moved into the second connector.

In some embodiments, an electronic assembly includes a substrate having at least one electronic component mounted thereto, and a first connector including a first connector housing having a bottom face disposed in a first plane, a plurality of first terminals disposed in the first connector housing and extending in a first direction angled relative to the first plane at an angle between 20 and 55 degrees. The electronic assembly also includes a second connector mounted to the substrate, the second connector including a base including a portion disposed in a second plane and facing the substrate, a first wing extending from the base, a second wing extending from the base, and a plurality of second terminals, where each of the plurality of terminals includes a first portion extending in the second plane and a second portion angled relative to the second plane at an angle between 10 and 40 degrees. In some embodiments, the first connector is mated to the second connector such that the plurality of first terminals press against respective ones of the plurality of second terminals, and the plurality of first terminals and/or the plurality of second terminals are elastically deformed so as to bias the first connector housing away from the base of the second connector. In some embodiments, the plurality of first terminals disposed in the first connector housing and extending in a first direction angled relative to the first plane at an angle between approximately 30 and 45 degrees, and the plurality of second terminals, where each of the plurality of terminals includes a first portion extending in the second plane and a second portion angled relative to the second plane at an angle between 20 and 30 degrees. In some embodiments, the first wing and the second wing each includes a projection receptacle, and the first connector housing includes a first projection extending into the projection receptacle of the first wing and a second projection extending into the projection receptacle of the second wing. In some embodiments, the projection receptacles of the first and second wings are circular, and the first and second projections are cylindrical. In some embodiments, the first and second projections each include an inclined face configured to deflect the first wing and second wing, respectively, so as to allow the first connector housing to move towards the base while the at least two projections are engaged with the first wing and second wing. In some embodiments, the first and second projections each includes surfaces perpendicular to a side of the housing configured to engage the projection receptacle of the first wing and the second wing, respectively, when the first connector housing is moved away from the base. In some embodiments, the first wing and second wing each includes a tab oriented in a parallel plane relative to the inclined faces of the first connector housing. In some embodiments, the first wing and second wing each has two projections receptacles, and the first connector housing has four projections. In some embodiments, the first connector housing includes two guides disposed on opposite sides of the first connector housing, the first wing and second wing each include a slot; and the two guides are each disposed of a slot of a respective one of the first and second wings. In some embodiments, the two guides extend in a direction parallel to the plurality of first terminals.

In some embodiments, an electrical connector includes a cable clamp plate, a plurality of terminals aligned with the cable clamp plate, dielectric material attached to the plurality of terminals and the cable clamp plate such that the plurality of terminals are physically supported relative to the cable clamp plate by dielectric material, and a plurality of cables disposed on the cable clamp plate. In some embodiments, the electrical connector further includes a metal shield enclosing the plurality of cables between the metal shield and the cable clamp plate. In some embodiments, the electrical connector further includes a dielectric connecting and at least partially surrounding the metal shield and cable clamp plate. In some embodiments, the electrical connector further includes a ground conductor laser welded to a ground portion of the plurality of terminals. In some embodiments, the plurality of terminals are physically severed from the cable clamp plate. In some embodiments, the electrical connector further includes a connector housing at least partially enclosing the cable clamp plate, plurality of terminals, and dielectric material. In some embodiments, the connector housing includes a tab receptacle, the cable clamp plate includes at least one tab engaged with the tab receptacle to retain the cable clamp plate in the connector housing. In some embodiments, the connector housing includes at least one projection, where the at least one projection includes an inclined face. In some embodiments, the projection in cylindrical. In some embodiments, the housing includes a bottom face disposed in a first plane, and where the plurality of terminals and cable clamp plate substantially extend in a second plane inclined relative to the first plane. In some embodiments, the second plane is angled relative to the first plane by an angle between approximately 30 and 45 degrees.

In some embodiments, a method of constructing a connector includes stamping a terminal assembly, where the terminal assembly includes a base extending in a first plane, a plurality of connected terminals having a first portion parallel to the first plane, and a second portion disposed at an angle relative to the first plane, a first wing including first projection receptacle, and a second wing including a second projection receptacle. The method also includes overmolding portions of the plurality of connected terminals with a dielectric material, and severing each of the plurality of connected terminals from one another. In some embodiments, overmolding portions of the plurality of connected terminals with a dielectric material further includes overmolding portions of the base. In some embodiments, the first wing of the stamped terminal assembly includes a first slot, and the second wing of the stamped terminal assembly includes a second slot. In some embodiments, stamping the terminal assembly includes spacing the first projection receptacle and second projection receptacle a predetermined distance from each of the plurality of terminals. In some embodiments, the predetermined distance has a tolerance within 0.25 mm. In some embodiments, the angular tolerance of the first wing, second wing, and second portion is within ±1 degree. In some embodiments, stamping the terminal assembly includes stamping the first wing with the first projection receptacle and the second wing with the second projection receptacle and the plurality of terminals from a unitary meal sheet in the same stamping operation. In some embodiments, the dielectric material is a plastic material. In some embodiments, overmolding the terminals includes forming an alignment post configured for insertion into a circuit board. In some embodiments, the first and second projection receptacles of the stamped terminal assembly are circular. In some embodiments, soldering each of the first portions of the terminals to a contact pad disposed on a circuit board. In some embodiments, soldering the first portions of the terminals includes reflow soldering. In some embodiments, the plurality of terminals includes 76 terminals. In some embodiments, each of the second portions of the plurality of terminals is angled at an angle between 15 and 45 degrees relative to the first plane. In some embodiments, each of the second portions of the plurality of terminals is angled at an angle between 20 and 30 degrees relative to the first plane.

The features of the above-described embodiments may be used alone or one or more of the above described features may be used together. For example, a board connector with one or more of the features described above may be mated with a cable connector with one or more of the features described above to form a connector assembly.

Accordingly, the foregoing description and drawings are by way of example only.

What is claimed is:

1. A method of constructing a connector, comprising:

stamping a terminal assembly, wherein the terminal assembly comprises:

a base extending in a first plane, a plurality of connected terminals having a first portion parallel to the first plane, and a second portion disposed at an angle relative to the first plane, a first wing including first projection receptacle, and a second wing including a second projection receptacle;

overmolding portions of the plurality of connected terminals with a dielectric material; and severing connected terminals of the plurality of connected terminals from one another.

2. The method of claim 1, wherein overmolding portions of the plurality of connected terminals with the dielectric material further comprises overmolding portions of the base.

3. The method of claim 1, wherein the first wing of the stamped terminal assembly comprises a first slot, and the second wing of the stamped terminal assembly comprises a second slot.

4. The method of claim 1, wherein stamping the terminal assembly comprises spacing the first projection receptacle and the second projection receptacle a predetermined distance from each of the plurality of connected terminals with a tolerance within 0.25 mm.

5. The method of claim 1, wherein stamping the terminal assembly comprises stamping the first wing with the first projection receptacle and the second wing with the second projection receptacle and the plurality of connected terminals from a unitary meal sheet in the same stamping operation.

6. The method of claim 1, wherein overmolding portions of the plurality of connected terminals comprises forming an alignment post configured for insertion into a circuit board.

7. The method of claim 1, wherein the first projection receptacle and the second projection receptacle of the stamped terminal assembly are circular.

8. The method of claim 1, wherein each of the second portions of the plurality of connected terminals is angled at an angle between 15 and 45 degrees relative to the first plane.

9. A method of constructing a connector, comprising:

stamping a terminal assembly, wherein the terminal assembly comprises:

a cable clamp plate, and a plurality of terminals extending from the cable clamp plate;

overmolding portions of the plurality of terminals with a dielectric material; and for a first portion of the plurality of terminals, severing a connection between the terminal and each of the other of the plurality of terminals.

10. The method of claim 9, wherein, prior to the severing, the plurality of terminals are electrically connected through the cable clamp plate, and wherein severing the connection, for each of the first portion of the plurality of terminals, comprises physically severing terminals of the first portion from the cable clamp plate such that a second portion of the plurality of terminals remain electrically connected through the cable clamp plate.

11. The method of claim 9, further comprising connecting a plurality of cables to the cable clamp plate.

12. The method of claim 11, wherein connecting the plurality of cables comprises compressing the plurality of cables against the cable clamp plate with a metal shield.

13. The method of claim 12, wherein connecting the plurality of cables further comprises welding the metal shield to the cable clamp plate.

14. The method of claim 13, wherein connecting the plurality of cables further comprises overmolding the metal shield, cable clamp plate and a portion of the plurality of cables.

15. The method of claim 12, wherein compressing the plurality of cables against the cable clamp plate comprises deforming one or more strain relief portions of the cable clamp plate.

16. The method of claim 15, wherein the one or more strain relief portions comprise an I-shaped opening in the cable clamp plate.

17. The method of claim 11, wherein:

the plurality of terminals comprise beams extending from the dielectric material; and the method further comprises welding an elongated conductor to the beams of a second portion of the plurality of terminals.

18. The method of claim 17, wherein the first portion of the plurality of terminals is disjointed from the second portion of the plurality of terminals.

19. The method of claim 11, further comprising inserting the terminal assembly, overmolded dielectric, and secured cables into a connector housing.

20. The method of claim 19, wherein the connector housing is formed of a dielectric material.

21. The method of claim 19, wherein the connector housing has a bottom face disposed in a first plane, and wherein the terminal assembly is inclined relative to the first plane.

22. The method of claim 21, wherein the terminal assembly is inclined at an angle between approximately 30 and 45 degrees relative to the first plane.

23. The method of claim 19, further comprising securing the terminal assembly in the connector housing by inserting a tab of the cable clamp plate into a tab receptacle of the connector housing.

24. The method of claim 19, wherein the connector housing comprises at least two guides disposed on opposite sides of the connector housing.

25. The method of claim 24, wherein the at least two guides extend in a direction parallel to the plurality of terminals.

26. The method of claim 19, wherein the connector housing comprises at least two projections configured to engage a connector receptacle.

27. The method of claim 26, wherein each of the at least two projections comprises a lead-in configured to engage the connector receptacle first when the connector housing is moved into the connector receptacle.

28. The method of claim 9, further comprising laser welding a ground conductor to a second portion of the plurality of terminals, separate from the first portion of the plurality of terminals.

* * * * *